US010479900B2

(12) United States Patent
Banerjee et al.

(10) Patent No.: US 10,479,900 B2
(45) Date of Patent: Nov. 19, 2019

(54) $VO_2$ AND $V_2O_5$ NANO- AND MICRO-MATERIALS AND PROCESSES OF MAKING AND USES OF SAME

(71) Applicant: The Research Foundation for The State University of New York, Buffalo, NY (US)

(72) Inventors: Sarbajit Banerjee, College Station, TX (US); Gregory Horrocks, College Station, TX (US)

(73) Assignee: The Research Foundation for The State University of New York, Buffalo, NY (US)

( * ) Notice: Subject to any disclaimer, the term of this patent is extended or adjusted under 35 U.S.C. 154(b) by 0 days.

(21) Appl. No.: 15/506,422

(22) PCT Filed: Aug. 26, 2015

(86) PCT No.: PCT/US2015/046968
§ 371 (c)(1),
(2) Date: Feb. 24, 2017

(87) PCT Pub. No.: WO2016/033194
PCT Pub. Date: Mar. 3, 2016

(65) Prior Publication Data
US 2017/0240752 A1    Aug. 24, 2017

Related U.S. Application Data

(60) Provisional application No. 62/042,025, filed on Aug. 26, 2014.

(51) Int. Cl.
*C01G 31/02* (2006.01)
*C09D 7/61* (2018.01)
(Continued)

(52) U.S. Cl.
CPC .............. *C09D 7/61* (2018.01); *C01G 31/02* (2013.01); *C08K 3/00* (2013.01); *C09D 5/24* (2013.01);
(Continued)

(58) Field of Classification Search
CPC ........ C01G 31/02; C01G 1/02; C01P 2002/52
See application file for complete search history.

(56) References Cited

U.S. PATENT DOCUMENTS 6,358,307 B1    3/2002  Legrand et al.
2002/0127397 A1    9/2002  Reinhard
(Continued)

FOREIGN PATENT DOCUMENTS

CN            1262480 C       7/2005
CN          101700909 A       5/2009
(Continued)

OTHER PUBLICATIONS

Liu, CrystEngComm, 2013, 15, p. 2753-2760 (Year: 2013).*
(Continued)

*Primary Examiner* — Robert C Boyle
(74) *Attorney, Agent, or Firm* — Hodgson Russ LLP

(57) ABSTRACT

$VO_2$ and $V_2O_5$ nano- or micro-materials. The $VO_2$ nano-materials and micro-materials have an M1 phase structure and oxygen stoichiometry that deviates 2% or less from theoretical stoichiometry. The $VO_2$ nano-materials and micro-materials may doped with cation dopants and/or anion dopants. The $VO_2$ and $V_2O_5$ nano- or micro-materials can be made by hydrothermal methods starting with $V_3O_7 \cdot H_2O$ nano- or micro-material. The $VO_2$ and $V_2O_5$ nano- or micro-materials can be used as, for example, thermochromic window coatings.

9 Claims, 10 Drawing Sheets

(51) Int. Cl.
| | | |
|---|---|---|
| C08K 3/00 | (2018.01) | |
| C09D 5/24 | (2006.01) | |
| C09D 5/26 | (2006.01) | |
| C09D 7/40 | (2018.01) | |
| C08K 3/22 | (2006.01) | |
| C08K 7/08 | (2006.01) | |
| C08L 101/00 | (2006.01) | |

(52) U.S. Cl.
CPC ............... *C09D 5/26* (2013.01); *C09D 7/70* (2018.01); *C01P 2002/52* (2013.01); *C01P 2002/54* (2013.01); *C01P 2002/72* (2013.01); *C01P 2002/76* (2013.01); *C01P 2002/77* (2013.01); *C01P 2002/82* (2013.01); *C01P 2002/88* (2013.01); *C01P 2004/03* (2013.01); *C01P 2004/04* (2013.01); *C01P 2004/16* (2013.01); *C01P 2004/61* (2013.01); *C01P 2004/62* (2013.01); *C01P 2004/64* (2013.01); *C01P 2004/84* (2013.01); *C01P 2006/32* (2013.01); *C01P 2006/33* (2013.01); *C01P 2006/60* (2013.01); *C08K 3/22* (2013.01); *C08K 7/08* (2013.01); *C08K 2003/221* (2013.01); *C08K 2201/005* (2013.01); *C08K 2201/011* (2013.01); *C08L 101/00* (2013.01)

(56) References Cited

U.S. PATENT DOCUMENTS

| | | | |
|---|---|---|---|
| 2002/0192147 A1 | 12/2002 | Choi et al. | |
| 2009/0208639 A1* | 8/2009 | Yun | C01G 31/02 427/126.3 |
| 2013/0101848 A1* | 4/2013 | Banerjee | C09K 9/00 428/402 |

FOREIGN PATENT DOCUMENTS

| | | |
|---|---|---|
| CN | 102120614 B | 10/2012 |
| CN | 103043722 A | 4/2013 |
| CN | 103241773 A | 8/2013 |
| CN | 102616849 B | 11/2013 |
| CN | 101880060 B | 12/2013 |
| CN | 102795968 | 7/2014 |
| CN | 104071843 A | 10/2014 |
| CN | 104192904 A | 12/2014 |
| CN | 102757094 B | 2/2015 |
| WO | 2012097688 | 7/2012 |

OTHER PUBLICATIONS

Zhang, Controlled synthesis and electrochemical properties of vanadium oxides with different nanostructures, Bulletin of Mat. Sci., vol. 35, Iss. 3, pp. 369-376. Jun 2012.
Zhang, Facile hydrothermal synthesis of vanadium oxides nanobelts by ethanol reduction of peroxovanadium complexes, Ceramics International, vol. 39, Iss. 1, Jan. 2013, pp. 129-141. Dec. 31, 2012.
Cao, Pure Single-Crystal Rutile Vanadium Dioxide Powders: Synthesis, Mechanism and Phase-Transformation Property, J. Phys. Chem. C, 2008, 112 (48), pp. 18810-18814. 2008.
Popuri et al., Rapid Hydrothermal Synthesis of VO2 (B) and Its Conversion to Thermochromic VO2 (M1), Inorg. Chem. May 6, 2013; 52(9). Apr. 12, 2013.
Livage, Hydrothermal Synthesis of Nanostructured Vanadium Oxides, Materials 2010, 3(8), pp. 4175-4195. 2010.
Liu, J., et al., Ultra-long VO2 (A) nanorods using the high-temperature mixing method under hydrothermal conditions: Synthesis, evolution and thermochromic properties, CrystEngComm, Mar. 2013, vol. 15, pp. 2753-2760.
Ji, S., et al., Formation mechanisms and crystallographic characteristics of metastable VO2(A) nanofiber hydrothermally synthesized in V2O5—H2C2O4—H2O system, Journal of Physics and Chemistry of Solids, Jan. 30, 2012, vol. 73, pp. 762-769.
Li, N., et al., A CTAB-assisted hydrothermal synthesis of VO2(B) nanostructures for lithium-ion battery application, Ceramics International, Jan. 23, 2013, vol. 39, pp. 6199-6206.

* cited by examiner

VO₂ AND V₂O₅ NANO- AND MICRO-MATERIALS AND PROCESSES OF MAKING AND USES OF SAME

CROSS-REFERENCE TO RELATED APPLICATIONS

This application claims priority to U.S. provisional patent application no. 62/042,025, filed Aug. 26, 2014, the disclosure of which is incorporated herein by reference.

STATEMENT REGARDING FEDERALLY SPONSORED RESEARCH

This invention was made with government support under contract no. IIP 1311837 awarded by the National Science Foundation. The government has certain rights in the invention.

FIELD OF THE DISCLOSURE

The present disclosure generally relates to $VO_2$ and $V_2O_5$ nano- and micro-materials. More particularly, the present disclosure relates to hydrothermal processes for making $VO_2$ and $V_2O_5$ nano- and micro-materials.

BACKGROUND OF THE DISCLOSURE

Vanadium (IV) dioxide, $VO_2$, has attracted significant research interest owing to its orders-of-magnitude first-order phase transition between insulating and metallic states that occurs at ca. 67° C. in the bulk. The metal-insulator transition temperature, $T_{MIT}$, is uncommonly close to room temperature, and this fortunate circumstance has inspired considerable interest in device architectures that can take advantage of the abrupt switching of electrical and optical properties accompanying this phase transition. A partial list of proposed device architectures that have been experimentally realized (to varying extents) includes Mott field transistors, spectrally selective thermochromic glazings for "smart window" applications, frequency-agile metamaterials for electromagnetic cloaking, periodic oscillators, memory devices based on two-terminal device configurations (mimicking neuromorphic circuits), and strain sensors. In addition, $VO_2$ has long served as an accessible system for fundamental explorations of strongly correlated behavior in materials. The occurrence of a structural phase transformation between monoclinic and tetragonal phases in close proximity to the electronic transition temperature has led to contrasting views regarding the relative importance of electron-electron and electron-phonon interactions in $VO_2$. However, it must be noted that the electronic and structural phase transitions can be separated for both thermally induced and photoactivated processes in this system. Scaling $VO_2$ to finite sizes allows for more robust accommodation of the strain generated during the structural phase transformation (in other words, enables protracted thermal cycling without cracking) and additionally allows for modification of the phase diagram to suppress the transition temperature and stabilize metastable phases.

From a synthetic perspective, $VO_2$ is a challenging target since it is only stable within a narrow sliver of the V—O binary phase diagram where it resides in immediate proximity to oxygen-deficient Magneli and Wadsley-type phases wherein extended defects such as crystallographic shear planes facilitate accommodation of periodic arrays of oxygen vacancies. The magnitude of the metal-insulator transition (for both optical and electrical properties) and $T_{MIT}$ thus vary sensitively as a function of oxygen stoichiometry in $VO_2$. $VO_2$ nano- or micro-structures derived from solution-phase methods are often plagued by broadened and relatively diminished metal-insulator transitions due to imperfect control of stoichiometry.

Optimal control of the stoichiometry of $VO_2$ and thereby materials exhibiting the most pronounced (above three orders of magnitude) phase transitions have been realized thus far primarily by physical vapor deposition methods such as high-temperature vapor-solid deposition, molecular beam epitaxy, pulsed laser deposition, and sputtering. In these methods, the structure can be dictated based on epitaxial homology with an underlying lattice-matched substrate, whereas the stoichiometry can be precisely defined by tuning the background pressure, precursor concentrations, and annealing conditions. Such variables tend to be more difficult to control in solution-phase syntheses and indeed homogeneous nucleation tends to favor stabilization of a metastable $VO_2(B)$ structure with the exception of reactions performed under high pressures.

Obtaining free-standing nanowires further allows for deployment of surface functionalization and colloidal chemistry approaches thereby enabling tuning of properties, incorporation within different matrices, and permitting the rational design of multicomponent nanocomposites. Sol-gel and hydrothermal approaches have previously been used to prepare $VO_2$ nanowires; the incorporation of W and Mo dopants appears to facilitate stabilization of the rutile (and upon cooling to room temperature, the M1 monoclinic) phase of $VO_2$.

BRIEF SUMMARY OF THE DISCLOSURE $VO_2$ and $V_2O_5$ nano- or micro-materials and methods of making the $VO_2$ and $V_2O_5$ nano- or micro-materials. Also provided are uses of the $VO_2$ and $V_2O_5$ materials.

In an embodiment, a method for making the $VO_2$ nano-material or micro-materials comprises: a) hydrothermally reducing $V_3O_7 \cdot H_2O$ nano- or micro-material with water and, optionally, one or more agents selected from the group consisting of: i) a $C_1$-$C_8$ linear or branched, substituted or unsubstituted, mono- or di-alcohol; ii) a $C_1$-$C_8$ linear or branched, substituted or unsubstituted mono- or di-carboxylic acid; or iii) a $C_1$-$C_4$ linear or branched, substituted or unsubstituted dialkyl-CO to produce a mixture of $VO_2$ (A) and $VO_2$ (B) nano- or micro-material; b) filtering and washing the product from a) to isolate the mixture of $VO_2$ (A) and $VO_2$ (B) nano- or micro-material; c) annealing the isolated mixture of $VO_2$ (A) and $VO_2$ (B) nano- or micro-material under an inert atmosphere at a temperature of at least 450° C.; and d) cooling the product of c) to produce $VO_2$ nano- or micro-material in the M1 phase. In an embodiment, the ratio (v/v) of agent to water in a) is 1:20 to 1:1. In an embodiment, the cooling in d) occurs by the cessation of heating. In an embodiment, a cation dopant source is present in a). In an embodiment, the cation dopant source comprises a metal. In an embodiment, the cation dopant source is a nitrate salt of the metal, acetate salt of the metal, oxalate salt of the metal, oxide of the metal, or a combination thereof. In an embodiment, the cation dopant source is tungstic acid, chromic acid, molybdic acid, lead acetate, tungsten oxide, molybdenum oxide, niobium oxide, chromium oxide, aluminum oxide, iron oxide, titanium oxide, zirconium oxide, tantalum oxide, scandium oxide, or gallium oxide. In an embodiment, an anion dopant source is present in a). In an embodiment, the anion dopant source comprises a semimetal or main group element.

In an embodiment, a method for making the $VO_2$ nano-material or micro-material further comprises obtaining $V_3O_7 \cdot H_2O$ nano- or micro-material by: a) hydrothermally exfoliating and reducing bulk vanadium pentoxide ($V_2O_5$) with water and a reducing agent; and b) filtering and washing the product from a) to isolate the $V_3O_7 \cdot H_2O$ nano- or micro-material.

In an embodiment, the $VO_2$ nano-material or micro-material has an M1 phase structure and oxygen stoichiometry that deviates 2% or less from theoretical stoichiometry. The $VO_2$ nano-material or micro-material exhibits a metal-insulator transition (also referred to herein as $T_{MIT}$) and 80% or more of the total change in resistivity resulting from the metal-insulator transition occurs over a range of 5° C. or less. As a result of the metal-insulator transition, at temperatures above the metal-insulator transition temperature the electrical resistance of the $VO_2$ nano-material or micro-material decreases by least 300 times relative to the electrical resistance of the $VO_2$ nano-material or micro-material at a temperature below the metal-insulator transition temperature and at temperatures below the metal-insulator transition temperature the electrical resistance of the $VO_2$ nano-material or micro-material increases by at least 300 times relative to the electrical resistance of the $VO_2$ nano-material or micro-material at a temperature above the metal-insulator transition temperature. In an embodiment, the metal-insulator transition temperature of the $VO_2$ nano-material or micro-material is −200° C. to 350° C. In various embodiments, the $VO_2$ nano-material or micro-material is a sheet, a beam, a spherical particle, or a wire. In various embodiments, the $VO_2$ nano-material or micro-material has a morphology selected from the group consisting of nanowires, nanostars, nanosheets, nanobelts, nanotetrapods, nanorods, nanospheres, nanoobelisks, nanodendrites, aligned nanowire arrays, and combinations thereof. In an embodiment, the $VO_2$ nano-material or micro-material is doped with a plurality of cation dopants and/or anion dopants, the cation dopants and/or anion dopants do not segregate into distinct phases, the cation dopants are substitutionally incorporated within a $VO_2$ structure such that they replace vanadium atoms in the $VO_2$ structure, and the anion dopants are substitutionally incorporated within a $VO_2$ structure such that they replace oxygen atoms in the $VO_2$ structure. In an embodiment, the $VO_2$ nano-material or micro-material is doped with a plurality of metal cations selected from the group consisting of K cations, Na cations, Cs cations, Sr cations, Ba cations, Ca cations, W cations, Mo cations, Ag cations, Pb cations Nb cations, Cr cations, Al cations, Fe cations, Ti cations, Zr cations, Ta cations, Sc cations, Ga cations, Cu cations, Co cations, Ni cations, rare-earth element cations, and combinations thereof, wherein the dopant is present in the nano-material or micro-material at 0.1 to 10% by weight, and the dopants do not segregate into distinct phases, the dopants are substitutionally incorporated within a $VO_2$ structure such that they replace vanadium atoms in the $VO_2$ structure, and/or the $VO_2$ nano-material or micro-material is doped with a plurality of anions selected from the group consisting of S anions, Se anions, Te anions, Cl anions, Br anions, I anions, and combinations thereof, the dopant is present in the nano-material or micro-material at 0.1 to 10% by weight, and the dopants do not segregate into distinct phases and the dopants are substitutionally incorporated within a $VO_2$ structure such that they replace vanadium atoms in the $VO_2$ structure. In an embodiment, the $VO_2$ nano-material or micro-material has a size of 1 nm to 1 micron. In an embodiment, the $VO_2$ nano-material or micro-material is a plurality of nanowires having a width of 50 to 500 nm. In an embodiment, the $VO_2$ nano-material or micro-material is at least partially covered by a layer of metal oxide selected from the group consisting of $TiO_2$, $ZnO$, $CeO_2$, $HfO_2$, $ZrO_2$, $Al_2O_3$, and combinations thereof.

In an embodiment, a coating comprises the $VO_2$ nano-material or micro-material. In an embodiment, the $VO_2$ nano-material or micro-material is disposed in a polymer. In an embodiment, the polymer is selected from the group consisting of polymethylmethacrylate, polyethylenimine, polyetherimide, polycarbonate, polyethylene oxide, polypyrrole polystyrene, and combinations thereof. In an embodiment, the coating exhibits thermochromic behavior, electrochromic behavior, or mechanochromic behavior based on a metal-insulator transition. In an embodiment, the metal-insulator transition is induced by heating the coating, application of voltage to the coating, flowing a current through the coating, or by imposition of strain on the coating. In an embodiment, the coating is disposed on the inner surface of the outer pane of a dual pane window.

DETAILED DESCRIPTION OF THE DISCLOSURE

Figure 1:
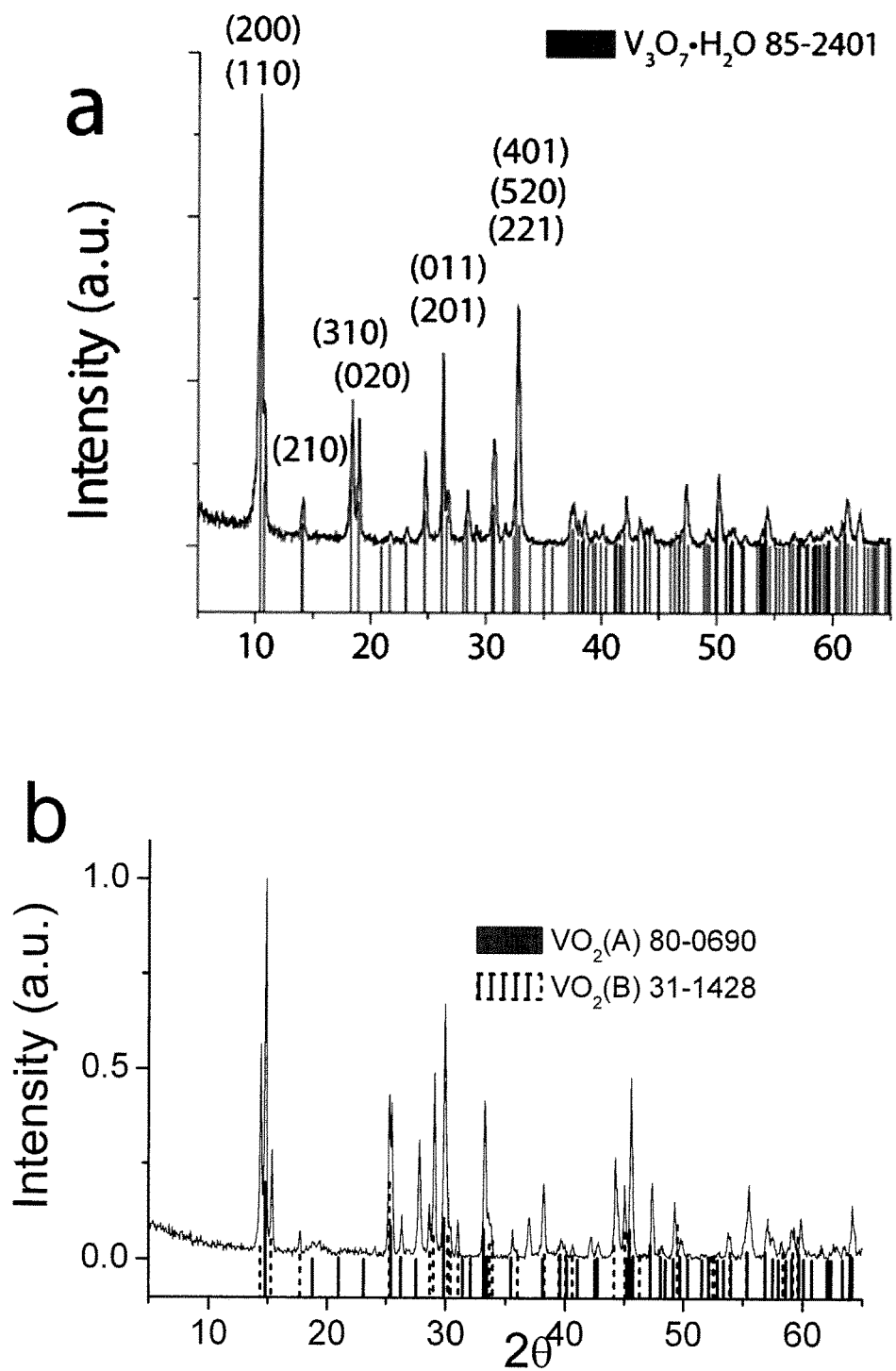
FIG. 1 shows the X-ray diffraction (XRD) patterns acquired for (a) as-synthesized $V_3O_7 \cdot H_2O$ nanowires; (b) initial mixture of $VO_2(A)$ and $VO_2(B)$ metastable phases obtained by reduction of $V_3O_7 \cdot H_2O$ nanowires with a 1:1 (v:v) mixture of deionized water and 2-propanol; and (c) $VO_2$ nanowires after annealing at 475° C. for 1 hour in an Ar ambient; (d) Differential scanning calorimetry (DSC) plot of M1 $VO_2$ nanowires showing an exothermic transition upon heating centered at 67.5° C. and an endothermic transition upon cooling centered at 63.1° C.
Figure 1:
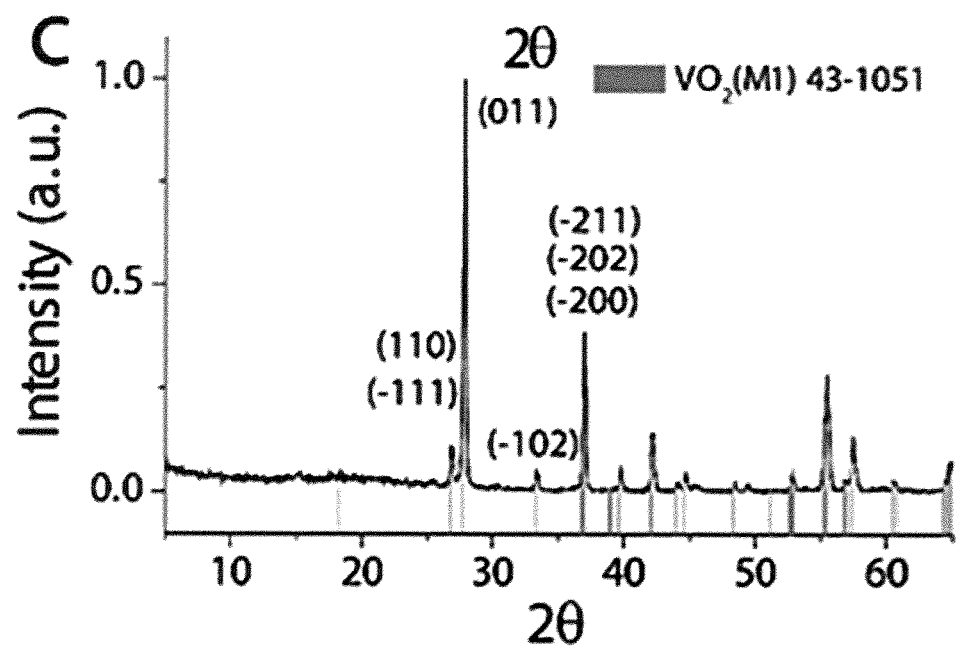
Figure 1:
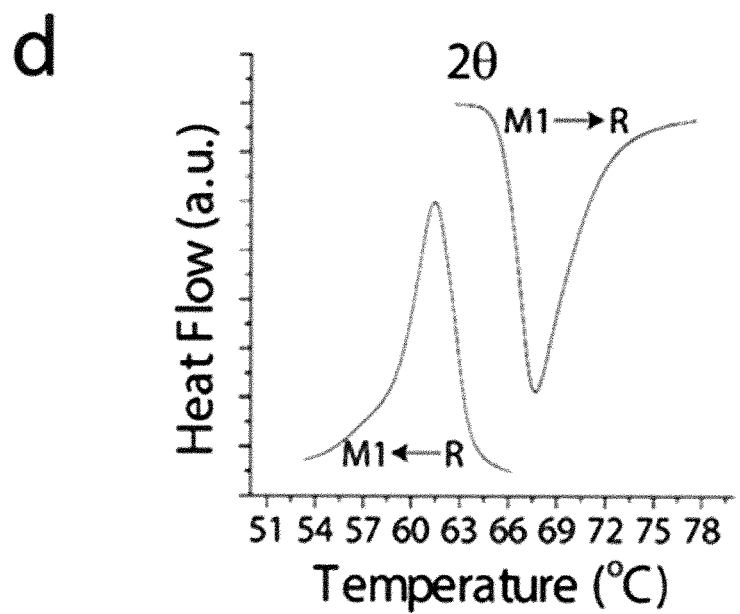

The present disclosure provides $VO_2$ and $V_2O_5$ nano- or micro-materials and methods of making the $VO_2$ and $V_2O_5$ nano- or micro-materials. Also provided are uses of the $VO_2$ and $V_2O_5$ materials.

The present disclosure provides a robust synthetic methodology that provides, for example, access to stoichiometry-controlled solution-derived $VO_2$ nanowires exhibiting massive metal-insulator transitions. It was surprisingly and unexpectedly found that $VO_2$ nano- or micro-materials having M1 phase structure and an oxygen stoichiometry that deviates by 2% or less from theoretical stoichiometry that exhibit a metal-insulator transition and, 80% or more of the total change in resistivity resulting from the metal-insulator transition occurs over a range of 20° C. or less were produced by the methods of the present disclosure.

For example, almost four orders of magnitude switching of resistance has been reproducibly realized for over 30 single-nanowire devices incorporating nanowires prepared by this method. For the prepared nanowires, both the structural and the electronic phase transitions have been characterized. The availability of free-standing $VO_2$ nanowires allows for examination of the intrinsic phase diagram of the solution-derived nanostructures without obscuration from substrate coupling and strain imposed by mismatches in the coefficient of thermal expansion between the lattice and the substrate. Raman spectroscopy has been used to study the structural phase transformation given the drastically different Raman signatures of the two phases. The electronic phase transition in these nanowires has further been examined by individual nanowire electronic transport measurements after integrating the nanowires within device architectures.

For example, the synthetic methodology is a stepwise scalable hydrothermal and annealing route for obtaining $VO_2$ nano- or micro-material exhibiting, for example, almost four orders of magnitude abrupt (e.g., within 0.1° C.) metal-insulator transitions. Prepared nanowires were characterized across their structural and electronic phase transitions using single-nanowire Raman microprobe analysis, ensemble differential scanning calorimetry, and single-nanowire electrical transport measurements. The electronic bandgap was determined to be 600 meV, which is consistent with the optical bandgap of $VO_2$ The narrowness of the differential scanning calorimetry profiles indicates homogeneity of stoichiometry. The preparation of high-quality free-standing nano- or micro-material exhibiting pronounced metal-insulator transitions by a solution-phase process allows for scalability, further solution-phase processing, incorporation within nano- or micro-composites, and integration onto arbitrary substrates. The nano- or micro-material may also be doped with, e.g., a transition metal, or by ion exchange, e.g., F for O.

Solution-phase methods are desirable for improved scalability (applications such as deployment in thermochromic glazings and functional coatings will require much greater quantities of material than can possibly be obtained by physical vapor deposition), cost-effectiveness, and are important for obtaining high-quality materials that are decoupled from substrates. The last listed aspect is especially important for obtaining materials that can be cast onto arbitrary substrates as desired for a specific application although modulation of the metal-insulator transition of $VO_2$ via lattice matching or substrate coupling also remains a rich area of study.

In an aspect, the present disclosure provides methods (also referred to herein as processes) of making $VO_2$ and $V_2O_5$ nano- or micro-materials. The methods are based on the hydrothermal reduction, or oxidation of vanadium oxide hydrate ($V_3O_7.H_2O$) nano- or micro-material. In an embodiment, the $VO_2$ and $V_2O_5$ nano- or micro-materials are produced by a method of the present disclosure.

In an embodiment, a process for manufacturing $VO_2$ nano- or micro-material in the M1 phase comprises: a) obtaining isolated vanadium oxide hydrate ($V_3O_7.H_2O$) nano- or micro-material; b) hydrothermally reducing isolated $V_3O_7.H_2O$ nano- or micro-material with water and, optionally, an agent (or multiple agents) selected from the group consisting of: i) a $C_1$-$C_8$ linear or branched, substituted or unsubstituted, mono- or di-alcohol; ii) a $C_1$-$C_8$ linear or branched, substituted or unsubstituted mono- or di-carboxylic acid; or iii) a $C_1$-$C_4$ linear or branched, substituted or unsubstituted dialkyl-CO to produce a mixture of $VO_2$ (A) and $VO_2$ (B) nano- or micro-material; c) filtering and washing the product of b) to isolate the mixture of $VO_2$ (A) and $VO_2$ (B) nano- or micro-material; d) annealing the isolated the mixture of $VO_2$ (A) and $VO_2$ (B) nano- or micro-material under an inert atmosphere at a temperature of at least 450° C.; and e) cooling the product of d) to produce $VO_2$ nano- or micro-material in the M1 phase. In an embodiment, the inert atmosphere is a noble gas or inert gas. For example, the noble gas or inert gas is be argon, helium, or nitrogen.

In an embodiment, a method for making $VO_2$ nano-material or micro-material comprises: a) hydrothermally reducing $V_3O_7.H_2O$ nano- or micro-material with water and, optionally, an agent (or multiple agents) selected from the group consisting of: i) a $C_1$-$C_8$ linear or branched, substituted or unsubstituted, mono- or di-alcohol; ii) a $C_1$-$C_8$ linear or branched, substituted or unsubstituted mono- or di-carboxylic acid; or iii) a $C_1$-$C_4$ linear or branched, substituted or unsubstituted dialkyl-CO to produce a mixture of $VO_2$ (A) and $VO_2$ (B) nano- or micro-material; b) filtering and washing the product from a) to isolate the mixture of $VO_2$ (A) and $VO_2$ (B) nano- or micro-material; c) annealing the isolated the mixture of $VO_2$ (A) and $VO_2$ (B) nano- or micro-material under an inert atmosphere at a temperature of at least 450° C.; and d) cooling the product of c) to produce $VO_2$ nano- or micro-material in the M1 phase. In an embodiment, the ratio (v/v) of agent to water in a) is 1:20 to 1:1. In an embodiment, the cooling in e) occurs by the cessation of heating.

In an embodiment, in the preceding embodiment further comprises obtaining $V_3O_7.H_2O$ nano- or micro-material by: a) hydrothermally exfoliating and reducing bulk vanadium pentoxide ($V_2O_5$) with water and a reducing agent; and b) filtering and washing the product from a) to isolate the $V_3O_7.H_2O$ nano- or micro-material.

In an embodiment, a process for manufacturing $V_2O_5$ nano- or micro-materials (e.g., $V_2O_5$ nano- or micro-wires) comprises: a) obtaining isolated vanadium oxide hydrate ($V_3O_7.H_2O$) nano- or micro-material; b) oxidizing $V_3O_7.H_2O$ in air at 150-650° C. to produce $V_2O_5$ nano- or micro-material.

The subject disclosure also provides the nano- or micro-material produced by the processes disclosed herein for manufacturing $VO_2$ nano- or micro-material in the M1 phase, as well as to the processed disclosed herein for manufacturing $V_2O_5$ nano- or micro-material.

The following embodiments are applicable to the processes disclosed herein for manufacturing $VO_2$ nano- or micro-material in the M1 phase, as well as to the processes disclosed herein for manufacturing $V_2O_5$ nano- or micro-material. Additionally, the following embodiments apply to the products of these processes.

The nano- or micro-material may be a sheet, a beam, rod, spherical nanoparticles, or a wire. In a preferred embodiment, the nano- or micro-material is a nanowire. The nanowires may be from about 20 to about 500 nm in width, including all ranges and widths therebetween.

The $VO_2$ nano- or micro-material or $V_2O_5$ nano- or micro-material may be subjected to post-synthesis processing to reduce the size of the materials. For example, the material is subjected to a grinding and/or milling process (e.g., ball-milling) such that a desired material size is obtained. In an embodiment, a method of making $VO_2$ nano- or micro-material or $V_2O_5$ nano- or micro-material disclosed herein further comprises grinding and/or milling the $VO_2$ nano- or micro-material or $V_2O_5$ nano- or micro-material, where the particle size of the material is reduced.

In an embodiment, the agent used during the $V_3O_7.H_2O$ nano- or micro-material hydrothermal reduction step is 2-propanol. In another embodiment, the agent is oxalic acid or citric acid. In another embodiment, the agent is acetone. In another embodiment, the agent is present as methanol, ethanol, 1,3-butanediol, 1,2-butanediol, butanol, octanol or propanol (e.g., 1-propanol).

The agent used during the $V_3O_7.H_2O$ nano- or micro-material hydrothermal reduction step and the water may be present in a ratio (v/v) from about 1:20 to about 1:1, including all integer ratios and ranges therebetween. In an embodiment, the ratio (v/v) is 1:1. In another embodiment, the agent is absent and the water is distilled water.

It may be desirable that the $V_3O_7.H_2O$ nano- or micro-material hydrothermal reduction step is carried out at a pressure of 350 bar or less. In an embodiment, the pressure is lower than 210 bar. In an embodiment, the pressure is lower than 125 bar. In another embodiment, the pressure is between about 100 bar and 125 bar.

In an embodiment, the $V_3O_7.H_2O$ nano- or micro-material hydrothermal reduction step is performed at about 150° C. to about 250° C.

In an embodiment the $V_3O_7.H_2O$ nano- or micro-material hydrothermal reduction step is conducted (e.g., in acetone) over about 16 to about 120 hours, including all ranges and hours therebetween. In an embodiment the $V_3O_7.H_2O$ nano- or micro-material hydrothermal reduction step is conducted over about 24 to about 120 hours, including all ranges and hours therebetween.

In an embodiment, the washing step is performed by water and acetone.

In an embodiment, the annealing is performed over a time period from about 1 minute to about 3 hours, including all ranges and minutes therebetween.

The product of the annealing step can be cooled to ambient temperature (e.g., room temperature) in a variety of manners. Room temperature can be, for example, 18° C. to 30° C. In an embodiment, the product of the annealing step is cooled to 18° C. to 25° C. The reaction mixture can be allowed to cool to ambient temperature without active cooling. The reaction mixture can also be subjected to controlled cooling or quenched. In an embodiment, the cooling step occurs by the cessation of heating.

Isolated vanadium oxide hydrate ($V_3O_7.H_2O$) nano- or micro-material may be obtained by, for example, the following process: a) hydrothermally exfoliating and reducing bulk vanadium pentoxide ($V_2O_5$) with water and a reducing agent; and b) filtering and washing the product of a) to isolate vanadium oxide hydrate ($V_3O_7.H_2O$) nano- or micro-material.

In an embodiment, the reducing agent is oxalic acid dihydrate ($H_2C_2O_4.2H_2O$). In another embodiment, the reducing agent is a carboxylic acid or an aliphatic alcohol. In yet another embodiment, the carboxylic acid is formic acid or oxalic acid. In still another embodiment, the aliphatic alcohol is ethanol, ethylene glycol, butanol (e.g., 2-butanol). In an added embodiment, the concentration range for the reducing agent is about 0.02 to about 0.05 M.

The methods of making $VO_2$ nano- or micro-materials or $V_2O_5$ nano- or micro-materials may be "one pot" syntheses starting with bulk $V_2O_5$. For example, the $V_3O_7.H_2O$ nano- or micro-material is not isolated after preparation of the material and subsequent synthetic steps (e.g., hydrothermal reduction or oxidation, annealing, and/or oxidation) are carried out using the un-isolated product(s).

In one embodiment, the hydrothermally exfoliating and reducing bulk vanadium pentoxide ($V_2O_5$) step is performed at a pressure lower than 125 bar. In another embodiment, the pressure is between about 100 bar and 125 bar.

In an embodiment, the washing step is performed by water and acetone.

In an embodiment, the hydrothermally exfoliating and reducing bulk vanadium pentoxide ($V_2O_5$) step is performed at about 150 to about 250° C.

In an embodiment, the hydrothermally exfoliating and reducing bulk vanadium pentoxide ($V_2O_5$) step is conducted over about 24 to about 120 hours, including all ranges and hours therebetween.

It is expected and understood that variations may be made in the disclosures described herein. These variations are considered within the scope of the disclosure. For instance, $V_3O_7.H_2O$ may be substituted by $V_3O_7.H_2O$ or other hydrated vanadium oxides.

Furthermore, dopants may be included. For instance, transition metal dopants could be added in the step synthesizing the $V_3O_7.H_2O$ as an acid precursor, such as tungstic or molybdic acid, or as a chloride, acetate, or nitrate salt. In addition to doping with tungsten or molybdenum, other transition metals may be employed, such as chromium, iron, niobium, tantalum or titanium. Dopants are not limited to transition metals and include, e.g., aluminum or magnesium.

One or more dopant sources may be present during the reduction of bulk $V_2O_5$ and/or during the hydrothermal reduction of $V_3O_7 \cdot H_2O$. The dopants replace oxygen and/or vanadium atoms in the $VO_2$ nano- or micromaterials or $V_2O_5$ nano- or micromaterials.

In an embodiment, the dopant source is a cation dopant source. For example, the cation dopant source comprises a metal and the dopant source is a nitrate salt of the metal, acetate salt of the metal, oxalate salt of the metal, oxide of the metal, chloride salt of the metal, or a combination thereof. Examples of suitable dopant sources include tungstic acid, chromic acid, molybdic acid, lead acetate, tungsten oxide, molybdenum oxide, niobium oxide, chromium oxide, aluminum oxide, iron oxide, titanium oxide, zirconium oxide, tantalum oxide, scandium oxide, gallium oxide, iridium oxide, or titanium chloride.

In an embodiment, an anion dopant source is present during the hydrothermal reduction of $V_3O_7 \cdot H_2O$. For example, the anion dopant source comprises a semi-metal or main group element. In an embodiment, the anion dopant source is an organic molecule comprising a semi-metal or main group element (e.g., ammonium salts comprising S, F, or Cl atoms). Examples of suitable anion dopant sources include thioureas, thioacetamides, and complex cation salts (e.g., nitrogen-containing cations such as ammonium salts and pyridinium salts). Mixtures of dopant sources may be used.

Another type of doping, i.e., ion exchange, may also be used. For example, O may be replaced by F in anion exchange and V may be replaced with a metal in cation exchange. Other elements, such as Ti, Cr, Fe, Mg, Ta, W, Mo, Sn, Sb, Ca or Mn, may additionally be employed. The amount of ion exchange may be up to about 10%. In an embodiment, a method of the present disclosure further comprises reacting the $VO_2$ nano- or micro-materials or $V_2O_5$ nano- or micro-materials with a dopant.

Ion exchange may proceed by a reaction of $VO_2$ with a fluoride source (e.g., inorganic fluorides such as $NH_4F$, NaF, KF, CsF or volatile fluorides such as $XeF_2$ or $XeF_4$). For example, the reaction is a solution-phase reaction or a vapor-phase reaction.

For example, ion exchange proceeds via a vapor phase reaction where the $VO_2$ is reacted with a volatile fluoride source (e.g., $XeF_2$ or $XeF_4$). Vapor phase $XeF_2$ or $XeF_4$ is reacted with the $VO_2$ nano- or micro-materials for 24 hours to 2 weeks in a very small amount of dry/degassed acetonitrile. The amount of $XeF_2$ or $XeF_4$ is from a molar ratio of nano- or micro-material to $XeF_2$ or $XeF_4$ of 1:0.1 to 1:20. The majority of the fluorine present does not go into the nano- or micro-material so a large excess may be required. Additional details are set forth in the Experimental Details section herein.

The method can be carried out under a variety of conditions (e.g., times, temperatures, and reactant concentrations). Without intending to be bound by any particular theory, it is considered that by selecting a reaction time, reaction temperature, and, optionally, dopant (e.g., dopant composition and/or concentration) a desired nano- or micro-material phase, stoichiometry (e.g., ratio of metal (vanadium and/or dopant metal) to oxygen, or ratio of metal to oxygen to dopant), or size (or size distribution) can be formed.

In an embodiment, the method is carried out such oxides corresponding to higher or lower oxidation states of vanadium (e.g., $V_2O_5$, $V_2O_3$ or other substoichiometric oxides) are not detectible in the isolated nano- or micro-material product at a level greater than 5% by weight. In various embodiments, the method is carried out such that oxides corresponding to higher or lower oxidation states of vanadium (e.g., $V_2O_5$, $V_2O_3$ or other substoichiometric oxides) not detectible in the isolated nano- or micro-material product at a level greater than 4%, 3%, 2%, or 1% by weight. Oxides corresponding to higher or lower oxidation states of vanadium can be detected by methods known in the art. For example, oxides corresponding to higher or lower oxidation states of vanadium are detected by x-ray diffraction, X-ray photoelectron spectroscopy, or vibrational spectroscopy.

The steps of the method described in the various embodiments and examples disclosed herein are sufficient to produce the $VO_2$ nano- or micro-materials or $V_2O_5$ nano- or micro-materials of the present disclosure. Thus, in an embodiment, the method consists essentially of a combination of the steps of the methods disclosed herein. In another embodiment, the method consists of such steps.

In an aspect, the present disclosure provides $VO_2$ nano- or micro-materials. The $VO_2$ nano- or micro-materials can be made by a method of the present disclosure. Accordingly, in an embodiment, the $VO_2$ nano- or micro-materials are made by a method of the present disclosure. In an embodiment, $VO_2$ nano- or micro-materials having M1 phase structure and an oxygen stoichiometry that deviates by 2% or less from theoretical stoichiometry are made by a method of the present disclosure.

The $VO_2$ nano- or micro-materials may be nanoparticles. The nanoparticles have crystalline structure. The nanoparticles can have a single domain or multiple electronic domains. The nanoparticles can be single crystalline nanoparticles.

The $VO_2$ nano- or micro-materials exhibit a low number of defects (e.g., vanadium defects and/or oxygen defects). In various embodiments, the $VO_2$ nano-material or micro-material has an M1 phase structure and oxygen stoichiometry that deviates 1.5% or less, 1.0% or less, 0.5% or less, or 0.1% or less from theoretical stoichiometry. For example, in the case of $VO_2$ nano- or micro-materials, theoretical stoichiometry is a vanadium:oxygen ratio of 1:2.

The $VO_2$ nano-material or micro-material exhibits a metal-insulator transition. For example, the metal-insulator transition is a transition from an insulating phase or semi-conducting phase (e.g., a band gap of 0.5 eV or less) to a metal phase. 80% or more of the total change in resistivity resulting from the metal-insulator transition (e.g., the change in resistivity between the insulator/semiconductor phase and metal phase) occurs over a range of 20° C. or less, 10° C. or less, 5° C. or less, 4° C. or less, 3° C. or less, 2° C. or less, 1° C. or less, or 0.5° C. or less. In various embodiments, the $VO_2$ nano-material or micro-material exhibits a metal-insulator transition and 90% or more, 95% or more, 96% or more, 97% or more, 98% or more, or 99% or more of the total change in resistivity resulting from the metal-insulator transition occurs over a range of 20° C. or less, 10° C. or less, 5° C. or less, 4° C. or less, 3° C. or less, 2° C. or less, 1° C. or less, or 0.5° C. or less. In various embodiments, the $VO_2$ nano-material or micro-material exhibits a metal-insulator transition that is complete (i.e., 100% of the total change in resistivity resulting from the metal-insulator transition occurs) in a range of 20° C. or less, 10° C. or less, 5° C. or less, 4° C. or less, 3° C. or less, 2° C. or less, 1° C. or less, or 0.5° C. or less. In general, incorporation of dopants broadens the transition as compared to undoped samples.

The $VO_2$ nano-material or micro-material has a metal-insulator transition temperature is −200° C. to 350° C., including all integer ° C. values and ranges therebetween. In an embodiment, the materials exhibit a metal-insulator transition at a temperature of −50° C. to 150° C. In another embodiment, the materials exhibit a metal-insulator transition at a temperature of −25° C. to 75° C.

As a result of the metal-insulator transition at temperatures above the metal-insulator transition temperature the electrical resistance of the $VO_2$ nano-material or micro-material decreases by at least 300 times relative to the electrical resistance of the $VO_2$ nano-material or micro-material at a temperature below the metal-insulator transition temperature and at temperatures below the metal-insulator transition temperature the electrical resistance of the $VO_2$ nano-material or micro-material increases by at least 300 times relative to the electrical resistance of the $VO_2$ nano-material or micro-material at a temperature above the metal-insulator transition temperature. In various embodiments, at temperatures above the metal-insulator transition temperature the electrical resistance of the $VO_2$ nano-material or micro-material decreases by at least 500 times, at least 750 times, at least 1000 times, at least 2500 times, or at least 5000 times relative to the electrical resistance of the $VO_2$ nano-material or micro-material at a temperature below the metal-insulator transition temperature and at temperatures below the metal-insulator transition temperature the electrical resistance of the $VO_2$ nano-material or micro-material increases by at least 500 times, at least 750 times, at least 1000 times, at least 2500 times, or at least 5000 times relative to the electrical resistance of the $VO_2$ nano-material or micro-material at a temperature above the metal-insulator transition temperature.

The $VO_2$ nano-material or micro-material can have a variety of forms. The $VO_2$ nano-material or micro-material can be, for example, a sheet, a beam, a spherical particle, or a wire. In various embodiments, the $VO_2$ nano-material or micro-material has a morphology selected from the group consisting of nanowires, nanostars, nanosheets, nanobelts, nanotetrapods, nanorods, nanospheres, nanoobelisks, nanodendrites, aligned nanowire arrays, microwires, microstars, microsheets, microbelts, microtetrapods, microrods, microspheres, microobelisks microdendrites, aligned microwire arrays, and combinations thereof.

The $VO_2$ nano-material or micro-material can have various sizes. For example, the $VO_2$ nano-material or micro-material has a size of 1 nm to 100 microns. In an embodiment, the $VO_2$ nano-material or micro-material is a plurality of nanowires having a width of 10 to 500 nm. Size is the longest dimension of the nano-material or micro-material (e.g., the diameter of a spherical nanoparticle). The size of the nano-material or micro-material can be measured by, for example, scanning electron microscopy, dynamic light scattering, or transmission electron microscopy.

The $VO_2$ nano-material or micro-material can be present in a variety of physical forms. For example, the material is present as a free-standing powder or as a bulk material comprising nanoparticles and/or microparticles. For example, the material is present as a dispersion of nanowires embedded within a polymeric matrix, a dispersion of nanowires within a solution, a sintered compact, a spray-coated thin film, a spin-coated or dip-coated thin film, or an aligned array assembled through standard Langmuir-Blodgett techniques. The $VO_2$ nano-material or micro-material (e.g, nano- and/or micro-particles) may be coated with organic or inorganic coatings to facilitate dispersion or preparation of thin film forms of the materials.

The $VO_2$ nano-material or micro-material may be doped. For example, the $VO_2$ nano-material or micro-material is doped with a plurality of metal cations selected from the group consisting of K cations, Na cations, Cs cations, Sr cations, Ba cations, Ca cations, W cations, Mo cations, Ag cations, Pb cations Nb cations, Cr cations, Al cations, Fe cations, Ti cations, Zr cations, Ta cations, Sc cations, Ga cations, Cu cations, Ir cations, Co cations, Ni cations, rare-earth element cations, and combinations thereof. For example, the dopant is present in the nano-material or micro-material at 0.1 to 10% by weight. The dopants do not segregate into distinct phases and the dopants are substitutionally incorporated within a $VO_2$ structure such that they replace vanadium atoms in the $VO_2$ structure.

The $VO_2$ nano-material or micro-material may be doped with a plurality of anion dopants. For example, the $VO_2$ nano-material or micro-material is doped with a plurality of anions selected from the group consisting of S anions, Se anions, Te anions, Cl anions, Br anions, I anions, and combinations thereof. The dopant is present in the nano-material or micro-material at 0.1 to 10% by weight, and the dopants do not segregate into distinct phases and the dopants are substitutionally incorporated within a $VO_2$ structure such that they replace oxygen atoms in the $VO_2$ structure.

The $VO_2$ nano-material or micro-material (e.g., nanoparticles or microparticles can be core-shell materials). The core is a $VO_2$ nano-material or micro-material (e.g., a nanoparticle or microparticle) as described herein. The shell comprises a metal oxide. In an embodiment, the materials are at least partially coated by a shell comprising a metal oxide such $TiO_2$, ZnO, $CeO_2$, $HfO_2$, $ZrO_2$, $Al_2O_3$, $Fe_2O_3$, $Fe_3O_4$, or a combination thereof. In another embodiment, the shell completely coats the materials. The thickness of the shell can be 0.5 nanometer to 250 nanometers, including all values to 0.5 nanometers and ranges therebetween. The metal oxide can be sol-gel materials. The metal oxides can be deposited using methods known in the art (e.g., sol-gel methods).

In an aspect, the present disclosure provides $V_2O_5$ nano- or micro-materials. The $V_2O_5$ nano- or micro-materials can be made by a method of the present disclosure. In an embodiment, the $V_2O_5$ nano- or micro-materials reversibly intercalate Li ions with less than 1 atom % remnance of Li ions upon delithiation or charging of an electrochemical cell comprising the materials. In an embodiment, $V_2O_5$ nano- or micro-materials are made by a method of the present disclosure.

In an aspect, the disclosure provides a composition comprising $VO_2$ nano-material or micro-material and/or $V_2O_5$ nano- or micro-materials. In an embodiment, the composition can further comprise a solvent and/or a polymer as described herein. The composition can be present in a variety of forms. For example, the composition can comprise discrete nano- and/or micro-materials (e.g., nanoparticles and/or micromaterials) or a bulk material (e.g., pellets comprising nano- and/or micro-materials). The bulk material can be formed from nano-materials and/or micromaterials sintered to form a bulk material (e.g., a nanostructured and/or microstructured ceramic material). The nano-materials and/or micromaterials can be present at 1% to 100% by weight, including all integer % by weight values and ranges therebetween. The nano-materials and/or micromaterials loading within matrices (polymer, ceramic) can vary from 0.1% to 99% by weight, including all values to 0.1% by weight and ranges therebetween.

The composition can comprise a polymer. The nano-materials and/or micromaterials are disposed in a polymer. In an embodiment, the nano-materials and/or micromaterials are dispersed in a polymer. Examples of suitable polymers include polymethylmethacrylate, polyetherimide, polyethylenimine, polystyrene, polyethyleneoxide, polypyrrole, polyaniline, and polycarbonate. Suitable polymers are commercially available or can be produced using known methods.

In an aspect, the disclosure provides a coating comprising the $VO_2$ nano-material or micro-material and/or $V_2O_5$ nano- or micro-materials. The coating can be formed from only nano- or micro-materials or a composition comprising nano- or micro-materials. The coating can be a continuous film comprising the nanoparticles. The nano- or micro-materials can be present at 0.1 to 100% by weight, including all values to 0.1% by weight and ranges therebetween. In an embodiment, the coating is formed from nano-materials nanoparticles having nanowire morphology.

The coating can have a wide range of thickness (e.g., a monolayer or nanoparticles, such a nanowire nano-materials, to thick films having a thickness of 10 millimeters or greater). In an embodiment, the coating can be from 1 nm to 100 μm, including all integer nanometer values and ranges therebetween. The coating can be present on at least a portion or on an entire substrate such as, for example, a glass substrate (e.g., a window) or metal substrate (e.g., a metal roof).

The coating of the present disclosure exhibits thermochromic behavior, electrochromic behavior, or mechnochromic behavior based on the metal-insulator transition of the nanoparticles. The metal-insulator transition can be induced by heating the coating, application of voltage to the coating, flowing a current through the film, or by imposition of strain on the coating.

The coating can be used in a variety of applications (e.g., in window applications, metal roof applications such as corrugated metal building, and automotive applications). For example, the coating can be disposed on the inner surface of the outer pane of a dual pane window. In an embodiment, the present disclosure provides a window having at least one pane at least partially coated with nanoparticles of the present disclosure. In another embodiment, the window is a dual pane window having the inside surface of the outer pane at least partially coated with the nano-materials and/or micro-materials. In the case of dual pane windows, the space between the two panes can be filled with an inert gas, such as argon or helium. In an embodiment, the inside surface of the outside pane is electrically connected to a voltage source, such as a household power supply or external power supply. The power supply provides electricity to enable electric switching of window properties by inducing a metal-insulator phase transition. In another example, the coating can be disposed on a metal roof. In an embodiment, the present disclosure provides a metal portion of a roof having at least partially coated with a nano-material and/or micro-materials of the present disclosure. In an embodiment, the metal is electrically connected to a voltage source, such as a household power supply or external power supply. The power supply provides electricity to enable electric switching of window properties by inducing a metal-insulator phase transition. In another embodiment, the doped $VO_2$ or $V_2O_5$ nano- or micro-materials can be components of a logic or memory device that is switched at a speed greater than 1 transition/minute.

The coating can be formed using a variety of methods. For example, the coating can be formed by spray-coating or wire-bar coating a dispersion of the nanoparticles in $H_2O$, N-methylpyrrolidone, 2-propanol, ethanol, 2-propanol, methyl ethyl ketone, acetone, or a combination thereof.

In an aspect, the present disclosure provides devices comprising the $VO_2$ and/or $V_2O_5$ nano- or micro-materials. The materials can be used in a variety of devices. Examples of devices include field-effect transistors, thermoresponsive and photoresponsive switching components, infrared waveguides, infrared modulators, and components for electromagnetic cloaking. In an embodiment, a device comprises single nanowire nanoparticles.

Throughout this application, the singular encompasses the plural.

The following examples are presented to illustrate the present disclosure. They are not intended to limiting in any manner.

Example 1

The following is an example of the preparation and characterization of a $VO_2$ nanomaterial of the present disclosure.

Experimental Details. Synthesis of $VO_2$ Nanowires. Procedure. $VO_2$ nanowires were prepared by a stepwise hydrothermal method. First, nanowires of $V_3O_7.H_2O$ were prepared via the hydrothermal exfoliation and reduction of bulk $V_2O_5$ (Sigma-Aldrich, 98%) by oxalic acid dihydrate (J. T. Bruker). In a typical reaction, 300 mg of $V_2O_5$ was placed in a 23 mL PTFE cup with 16 mL of deionized water (p=18.2 MΩ/cm, Barnstead International Nanopure Diamond) and 75 mg of oxalic acid dihydrate. The cup was then placed in a sealed autoclave and heated at a temperature of 210° C. for 72 hours. This reaction can be reproducibly scaled using a 125 mL autoclave. For the large-scale reactions, 1.6304 g $V_2O_5$ powder and 451 mg of oxalic acid dihydrate were reacted hydrothermally in 75 mL of deionized water. The resulting nanowires were filtered and washed with copious amounts of water and acetone.

The isolated $V_3O_2.H_2O$ nanowires were then subsequently hydrothermally reduced by a 1:1 v/v mixture of water and 2-propanol (Fisher). In a typical reaction, 300 mg of the $V_3O_2.H_2O$ nanowires were placed in a PTFE cup with 8 mL of deionized water and 8 mL of 2-propanol. The PTFE cup was then placed within a sealed autoclave and heated at a temperature of 210° C. for 72 hours. The obtained mixture of $VO_2(A)$ and $VO_2(B)$ nanowires was isolated by filtration and washed with copious amounts of deionized water and acetone. Both hydrothermal reactions are performed at pressures less than 125 bar enabling the use of low-pressure autoclaves. The collected nanowires (mixture of $VO_2(A)$ and $VO_2(B)$) were subsequently annealed at 475° C. under an Ar atmosphere in a tube furnace while maintaining an Ar flow of 150 mL/min for 1 hour; $VO_2$ nanowires crystallized in the M1 phase were recovered after cooling to room temperature.

Powder X-Ray diffraction (XRD) characterization of the prepared materials was performed using a Rigaku Ultima IV diffractometer (Cu Kα radiation; voltage of 40 kV, current of 44 mA). JADE 8.5 was used for pattern fitting and phase identification. Differential scanning calorimetry (DSC, Q200 TA Instruments) was performed between −50 and 150° C. under a flowing Ar atmosphere. The morphology and purity of the obtained nanowires was examined by scanning electron microscopy coupled with energy dispersive x-ray spectroscopy (SEM, EDX, Hitachi SU-70 operated at 15 kV) and transmission electron microscopy (TEM, JEOL JEM-2010 operated at an accelerating voltage of 200 kV).

TEM samples were prepared by dispersing nanowires in 2-propanol by ultrasonication, and casting onto 400 mesh copper grids coated with a formvar/carbon film.

Raman spectra were acquired using a Jobin-Yvon Horiba Labram HR instrument coupled to an Olympus BX41 microscope. The 514.5 nm line from an Ar-ion laser was used as the excitation source. The Raman spectra were acquired using a 1800 lines/mm grating yielding a spectral resolution of better than 2 cm$^{-1}$. The in situ heating measurements were performed under a $N_2$ atmosphere using a sealed THMS 600 thermal stage from Linkam Scientific Instruments. The samples were left to equilibrate at each temperature for 300 s prior to acquiring the Raman spectrum.

Electrical transport measurements of single nanowires were performed using a variable temperature cryostat insert. The nanowires were first dispersed and cast onto $Si/SiO_2$ (300 nm) substrates. Subsequently, Au electrodes (70 nm) were patterned after defining contacts to the nanowires using a combination of electron-beam lithography and photolithography; Cr metal (5 nm) was used as the adhesion layer. Resistance versus temperature measurements were acquired for both heating and cooling cycles between 27 and 107° C. Current versus voltage measurements were acquired using single-nanowire devices fabricated by the same method. The current across the devices was measured by sweeping the voltage between 0 and 2 V while holding temperature constant.

The prepared nanomaterials have been characterized across the successive reductive steps as well as across the structural and electronic phase transitions of $VO_2$. FIG. 1 illustrates the characterization of the nanowires through each step of the synthetic approach. The hydrothermal reduction of $V_2O_5$ by oxalic acid yields phase-pure $V_3O_7 \cdot H_2O$ nanowires as per the following reaction:

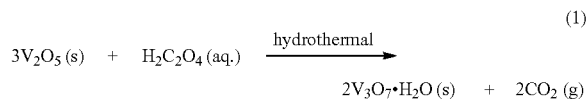

$$3V_2O_5(s) + H_2C_2O_4(aq.) \xrightarrow{\text{hydrothermal}} 2V_3O_7 \cdot H_2O(s) + 2CO_2(g) \quad (1)$$

Figure 2:
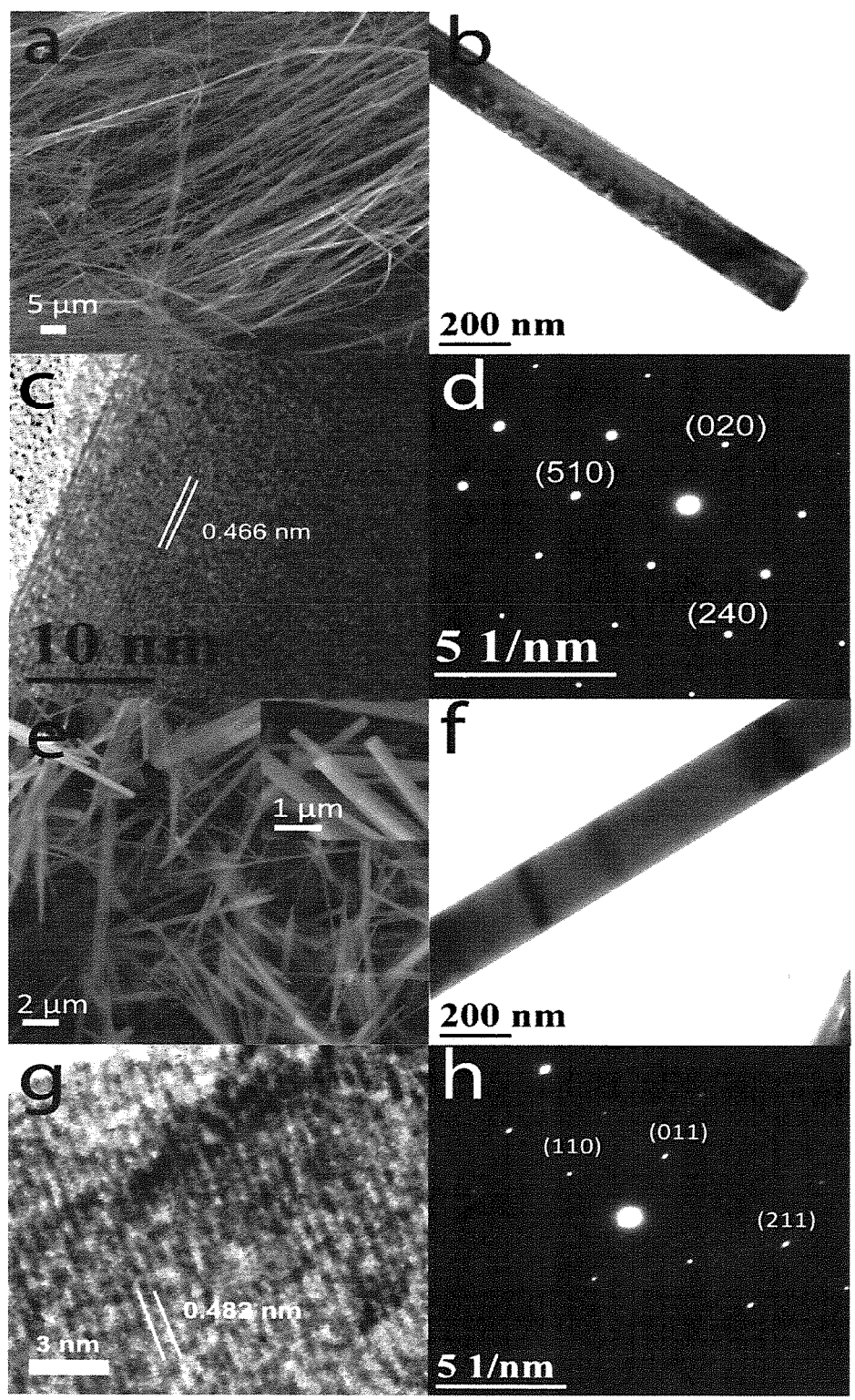
FIG. 2 presents the (a) SEM and (b) TEM images of $V_3O_7 \cdot H_2O$ nanowires. (c) Lattice-resolved HRTEM image of $V_3O_7 \cdot H_2O$ nanowires indicating an interplanar separation of 0.466 nm corresponding to the spacing between (020) lattice planes. (d) Indexed SAED pattern acquired for an individual $V_3O_7 \cdot H_2O$ nanowire. (e) SEM image of monoclinic $VO_2$ nanowires with the inset indicating rectangular cross-sections. (f) TEM image of a monoclinic $VO_2$ nanowire. (g) HRTEM image of a monoclinic M1 phase $VO_2$ nanowire indicating an interplanar separation of 0.482 nm. (h) Indexed selected area electron diffraction (SAED) pattern acquired for an individual monoclinic $VO_2$ nanowire.

FIG. 1a indicates the XRD pattern acquired for these nanowires, which can be indexed to PDF#84-2801. FIGS. 2a and 2b show SEM and TEM images of $V_3O_7 \cdot H_2O$ nanowires. The nanowires are 183±34 nm wide and range up to hundreds of microns in length. The subsequent hydrothermal reduction of $V_3O_7$ using a mixture of 2-propanol and water as per:

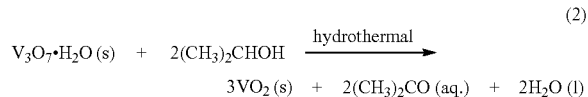

$$V_3O_7 \cdot H_2O(s) + 2(CH_3)_2CHOH \xrightarrow{\text{hydrothermal}} 3VO_2(s) + 2(CH_3)_2CO(aq.) + 2H_2O(l) \quad (2)$$

yields a mixture of the metastable $VO_2(A)$ (PDF#: 80-0690) and $VO_2(B)$ (PDF#: 31-1428) phases as illustrated by the XRD pattern shown in FIG. 1b. Oxalic acid and citric acid can also be used for the reduction of $V_3O_7 \cdot H_2O$ and do yield a similar mix of $VO_2(A)$ and $VO_2(B)$ phases; however, the obtained materials are poorly defined in terms of their morphologies. 2-propanol appears to be the optimal reducing/structure-directing agent for obtaining well-defined nanowires. Reaction using just deionized water yields the metastable $VO_2(B)$ phase but with a substantial amount of other mixed-valence vanadium oxide phases resulting from incomplete reduction. While reaction with other small aliphatic molecules yield similar mixtures of the two metastable phases after reduction, the overall particle size remained significantly larger than that achieved via the 2-propanol reduction. Upon annealing the products of the 2-propanol reduction reaction, the M1 phase of $VO_2$ is recovered as illustrated in FIG. 1c. At temperatures less than 450° C., there is evidence for substantial remnant $VO_2(B)$. The $VO_2(A)$ and $VO_2(B)$ phases have less close packed frameworks with greater void space and have been predicted to undergo an order-disorder transition with eventual recrystallization into the rutile phase of $VO_2$, which subsequently transforms to the M1 monoclinic phase upon cooling. Fortuitously, for loosely packed powders of $VO_2$ nanowires, the transformation is induced well before initiation of sintering, allowing for retention of the morphology originally defined by the hydrated $V_3O_7$ nanowires. Conversely, annealing under an air or oxygen ambient under the same conditions yields phase-pure $V_2O_5$ nanowires without appreciable sintering and with similar dimensions. Note that the annealing step is performed on the powder samples and the resulting nanowires synthesized on the multi-gram scale are available for incorporation onto arbitrary substrates or within host matrices including polymers.

The thermally and electrically induced M1→R phase transition is first order in nature and accompanied by a substantial change in thermal conductivity as well as a discontinuous jump in carrier concentration. Being a first-order phase transition, the structural phase transformation is associated with a substantial latent heat and alteration of the specific heat capacity. The latent heat at the phase transition arises from the structural distortion of the lattice and the change in entropy of the conduction electrons (which are no longer localized in the insulating state). FIG. 1d shows pronounced endothermic and exothermic DSC profiles for the $VO_2$ nanowires centered at 67.5 and 61.3° C. upon heating and cooling, respectively. The FWHM of the DSC profiles are 3.8 and 3.0° C., respectively. These FWHM values are much narrower than the 10-15° C. FWHMs observed previously for solution-derived undoped and W-doped $VO_2$ nanowires. As an ensemble measurement across multiple nanowires, the width of the observed transition reflects the distribution of temperatures at which the nanowires are undergoing the metal-insulator transition. The narrower ensemble DSC profile implies greater homogeneity of the transition temperature across the nanowire sample indicating much tighter stoichiometric control of the prepared nanowires. The latent heat of the endothermic insulator→metal transition is determined to be 7.88 J/g based on integrating the area of the transition.

FIG. 2e depicts SEM images of the monoclinic $VO_2$ nanowires after annealing and shows well-defined nanowires with rectangular cross-sections and lengths on the order of tens of microns, while EDX analysis indicates no inadvertent dopant inclusion during the synthetic procedure. TEM images of the nanowires indicate an average width of 187±77 nm (FIG. 2f), essentially retaining the lateral dimensions of the original $V_3O_7 \cdot H_2O$ precursor nanowires with some fragmentation resulting from the order-disorder transition discussed above. Lattice-resolved HRTEM images (FIG. 2g) and the selected area electron diffraction (SAED) patterns acquired for an individual nanowire (FIG. 2h) corroborate the phase assignment to the M1 monoclinic phase of $VO_2$. The lattice-resolved HRTEM image in FIG.

2g indicates an interplanar separation of 0.481 nm, which corresponds to the separation between the (100) planes of monoclinic $VO_2$.

Figure 3:
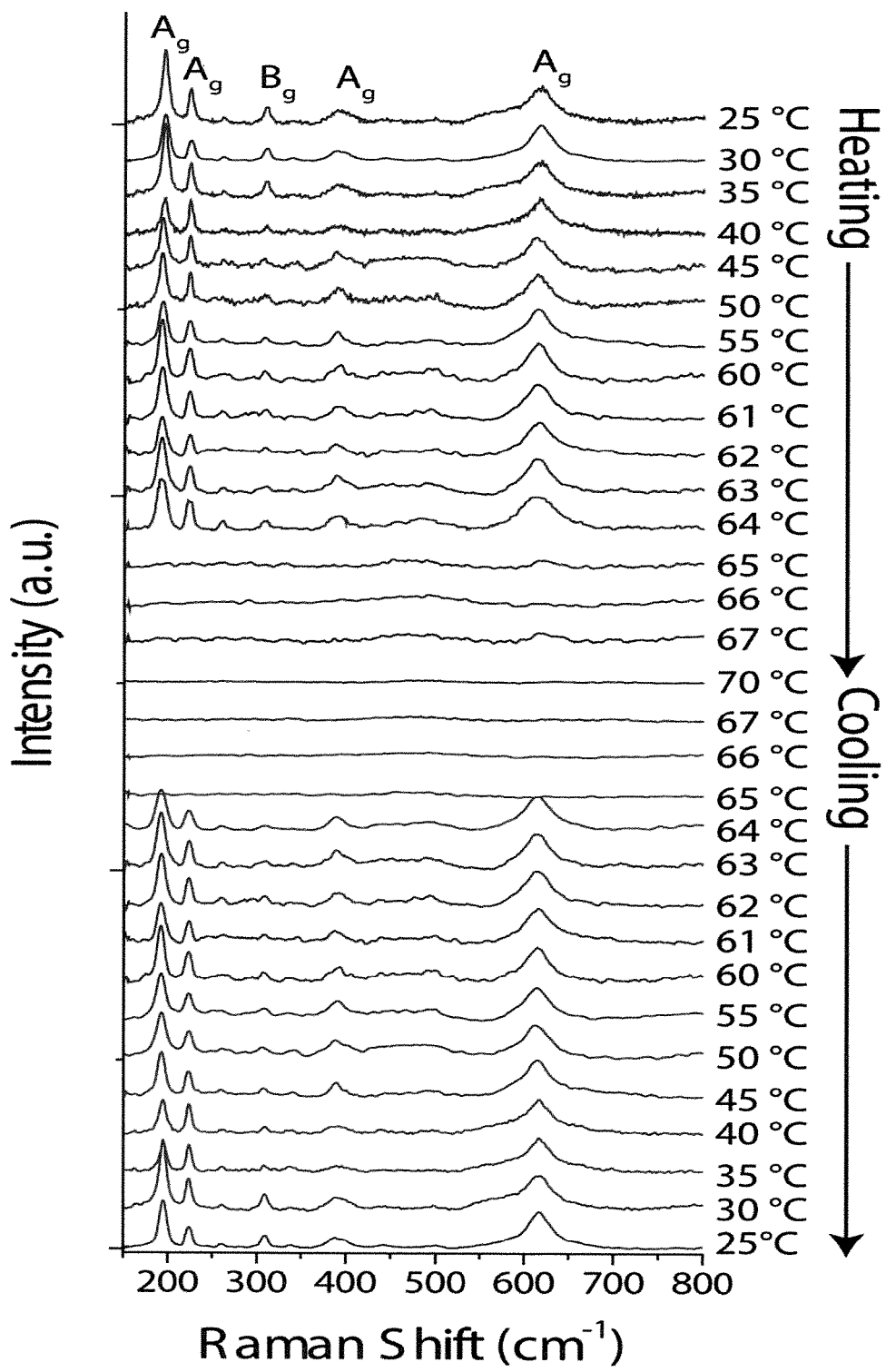
FIG. 3 depicts the Raman spectra acquired for an individual $VO_2$ nanowire upon heating and cooling across the metal-insulator transition. Upon heating, all Raman-active modes of the insulating M1 monoclinic phase are lost when the nanowire transitions to the high-symmetry metallic rutile phase between 64 and 65° C. The nanowire then transitions back to the M1 phase upon cooling between 65 and 64° C. Note the abruptness of the transition that corroborates claims of high crystal quality.

Raman microprobe analysis provides an excellent spatially localized probe of the structural progression of the phase transition in $VO_2$. The M1 monoclinic, M2 monoclinic, triclinic, and rutile phases of $VO_2$ have distinctive Raman spectral signatures arising from their varying local symmetry. The rutile and M1 phases crystallize in $P4_2/mnm$ ($D_{4h}^{14}$) and $P2_1/c$ ($C_{2h}^3$) space groups, respectively, with the latter predicted to have 18 Raman-allowed modes, nine each of $A_g$ and $B_g$ symmetry. Raman spectra have been acquired for individual $VO_2$ nanowires (by dispersing the nanowires shown in FIG. 2e on a glass substrate) as a function of temperature across the metal-insulator transition. The spectra for a representative nanowire are depicted in FIG. 3. The modes observed at low temperatures can be assigned to the M1 monoclinic phase of $VO_2$ with the symmetry assignments denoted in the figure derived from group theory considerations and previously published polarized Raman spectroscopy studies. In contrast, the rutile phase has a much lower Raman cross-section and does not exhibit distinct modes in keeping with its metallic character (the laser skin depth is also greatly diminished by the much greater concentration of carriers in the metallic phase). Upon heating under a nitrogen ambient, the Raman spectra does not show much of a change until between 64 and 65° C. an abrupt and sudden loss of all Raman-active modes is evidenced, indicating complete conversion to the metallic rutile phase. Remarkably, the transition is not preceded by any discernible attenuation of intensity or shifts of the Raman modes suggesting that the entire nanowire is transformed as a single domain (within the limits of experimental resolution). The Raman modes are further recovered upon cooling back to 64° C.

Unlike $VO_2$ nanobeams coupled to substrates grown by vapor transport, there is no evidence in the Raman data for stabilization of the M2 phase (which crystallizes in the $C_{2h}^5$ space group and is characterized by a splitting of the $A_g$ mode at 221 $cm^{-1}$ and a shift of the $A_g$ mode at 607 $cm^{-1}$ to 649 $cm^{-1}$). Consistent with the narrow lineshapes of the ensemble DSC profiles, the sharp discontinuities noted here are surmised to result from improved homogeneity in stoichiometry across the nanowires.

Figure 4:
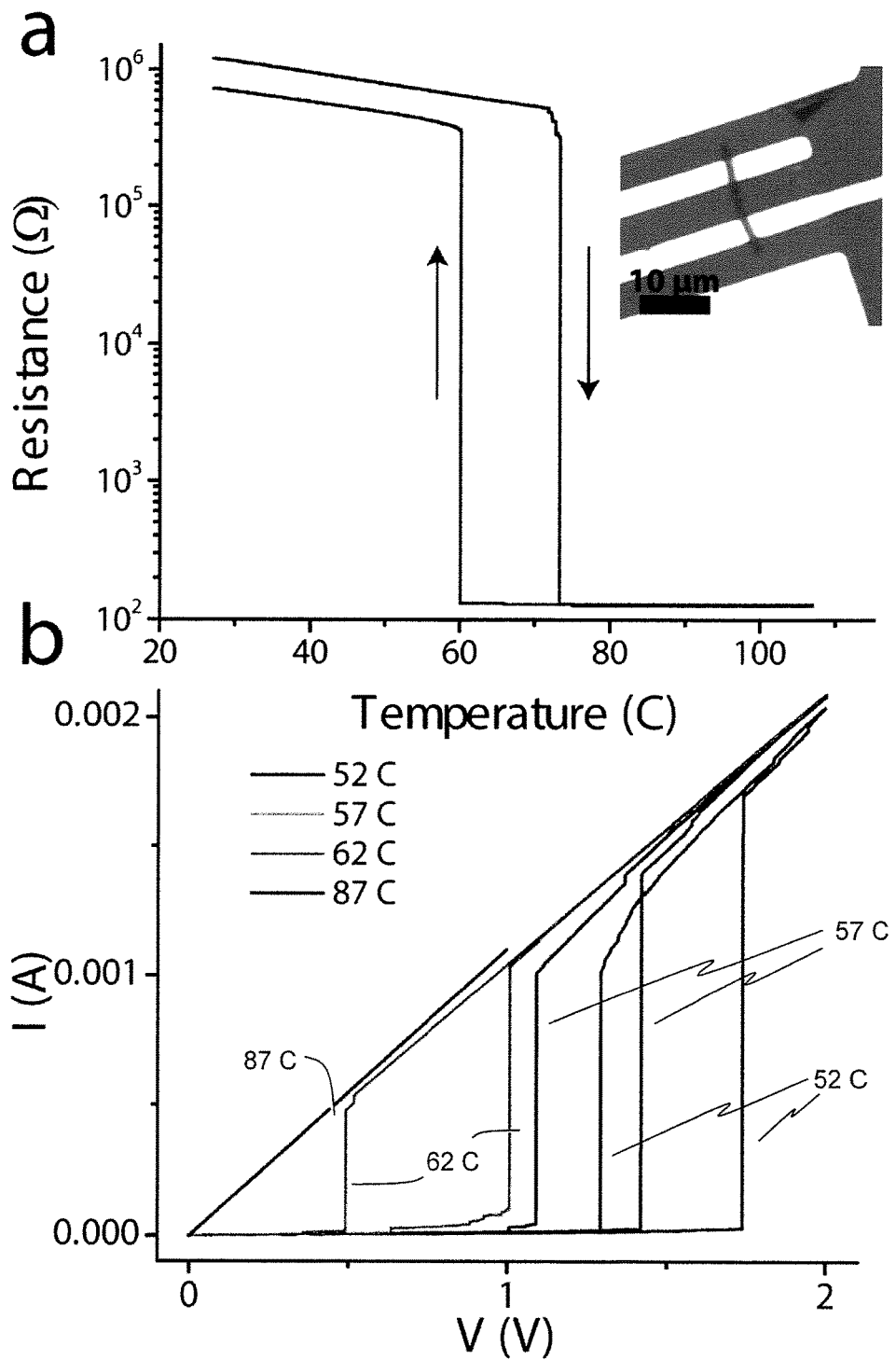
FIG. 4 demonstrates (a) resistance versus temperature measured for an individual-nanowire device indicating a transition between the insulating and metallic phases within 0.1° C. at 73.3° C. The inset depicts an optical micrograph of the device. (b) Current versus voltage measurements for single-nanowire devices show abrupt voltage-driven transitions between the insulating and the metallic phases at temperatures below the transition temperature. The threshold voltage required to induce the insulator→metal transition is clearly decreased with increasing temperature.
Figure 5:
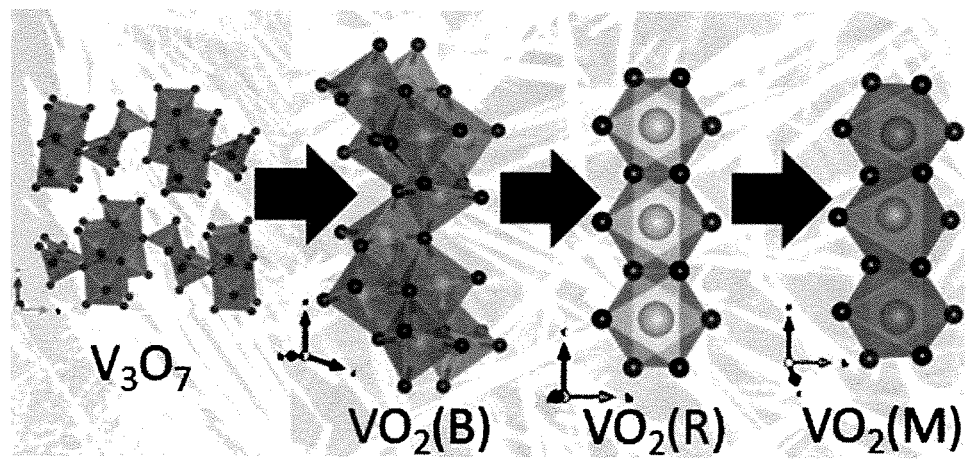
FIG. 5 illustrates the structural geometry of the compounds involved in a process of making $VO_2$.

The pronounced switching behavior thought to be characteristic of stoichiometric $VO_2$ is most patently manifested in electrical transport measurements of individual nanowires across their metal-insulator transitions induced by temperature or voltage, as depicted in FIG. 4. Note that the nanowires have been solution cast (from 2-propanol dispersions) onto $Si/SiO_2$ (300 nm) substrates and no effort has been invested in liberating the nanowires from the substrate as was previously required to observe abrupt transitions for nanobeams deposited by vapor transport where coupling to the substrate induces inhomogeneous strain. FIG. 4a illustrates that the transition from the insulating to the metallic phase is characterized by a greater than three (almost four) orders of magnitude decrease in resistance across a span of just 0.1° C.; the transition back to the insulating phase is similarly abrupt with the hysteresis of 13.2° C. derived from the first-order nature of the transition. The Arrhenius behavior in the insulating phase of the nanowires is well fitted with $R(T)=R_0 \exp[E_g/2kT]$ (where k is Boltzmann's constant and T is temperature) and yields an electrical bandgap ($E_g$) of 600 meV, which is consistent with the values observed for suspended $VO_2$ nanobeams and indeed the optical bandgap of $VO_2$. The bandgap, for these nanowires is significantly greater than the 80-200 meV values observed previously for solution-grown W-doped $VO_2$ nanowires and confirms the tight control of stoichiometry and the absence of inadvertent doping. Dimensional confinement in high-crystalline-quality nanostructures limits the number of possible nucleation sites and thereby can kinetically inhibit initiation of a phase transformation, yielding a greater hysteresis than observed in the bulk. Of the thirty devices tested (each comprising an individual nanowire), the insulator→metal transition has been observed at a temperature of 71±2° C., with the transition spanning no greater than 1° C. The abruptness of these transitions are in stark contrast to previous observations for hydrothermally prepared and especially doped nanostructures that typically show broader insulator→metal (or metal→insulator) profiles spanning 3-5° C. for undoped $VO_2$ and ranging up to 10-20° C. for doped samples. The current versus voltage plots depicted in FIG. 4b are analogously characterized by sharp switching of the conductivity above a threshold voltage with the threshold voltage required to trigger the transition being inversely correlated to temperature. For temperatures below $T_{MIT}$, upon reaching the specific threshold voltage, a discontinuous increase in current is evidenced indicating a transition to a metallic phase. In the insulator→metal direction, the threshold voltage ($V_{th}$) for the transition shows an approximately exponential $V_{th} \propto \exp(-T/T_0)$ dependence that is characteristic of a charge delocalization in a charge ordered system. In other words, the non-equilibrium application of an electric field injects carriers into the nanowires. Beyond a critical carrier density, Thomas-Fermi screening of bound excitonic states by the injected free carriers leads to an abrupt increase of the carrier density, resulting in transformation of the system to a metallic state even at low temperatures. At low temperatures, a sharp singular, almost step-function-like, jump is noted upon reaching the threshold voltage; at temperatures approaching (but less than) $T_{MIT}$, a number of discontinuous jumps are observed that are attributed to progression of the phase transition through avalanche-type events and the stabilization of a strongly correlated metallic phase. Thermal effects are convoluted with the electric-field induced effects closer to the transition temperature, whereas the electric-field-induced delocalization of charge ordering motifs is more clearly observed at low temperatures. Above $T_{MIT}$, no voltage-induced metal-insulator transition is evidenced and instead a linear current versus voltage trace is observed indicating that the $VO_2$ nanowire is already in a metallic state. The abruptness of the metal-insulator transition evidenced in both the thermal and electric-field-induced transitions further corroborates the good crystalline quality and tight stoichiometric control of the $VO_2$ nanowires.

Figure 6:
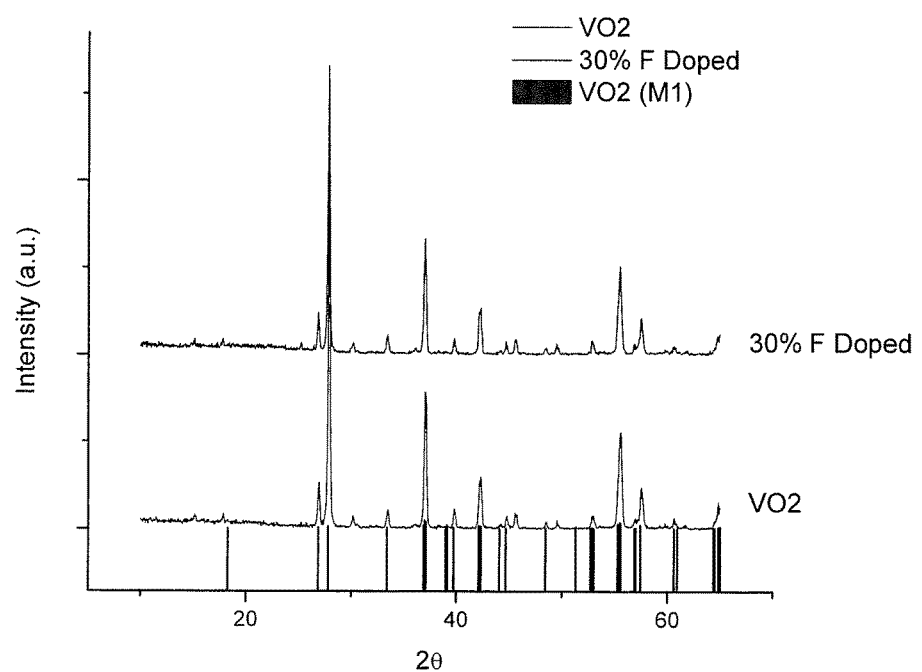
FIG. 6 sets forth the XRD of $VO_2$ nanowires and F-doped $VO_2$ nanowires (anion exchange) showing retention of the M1 phase.
Figure 7:
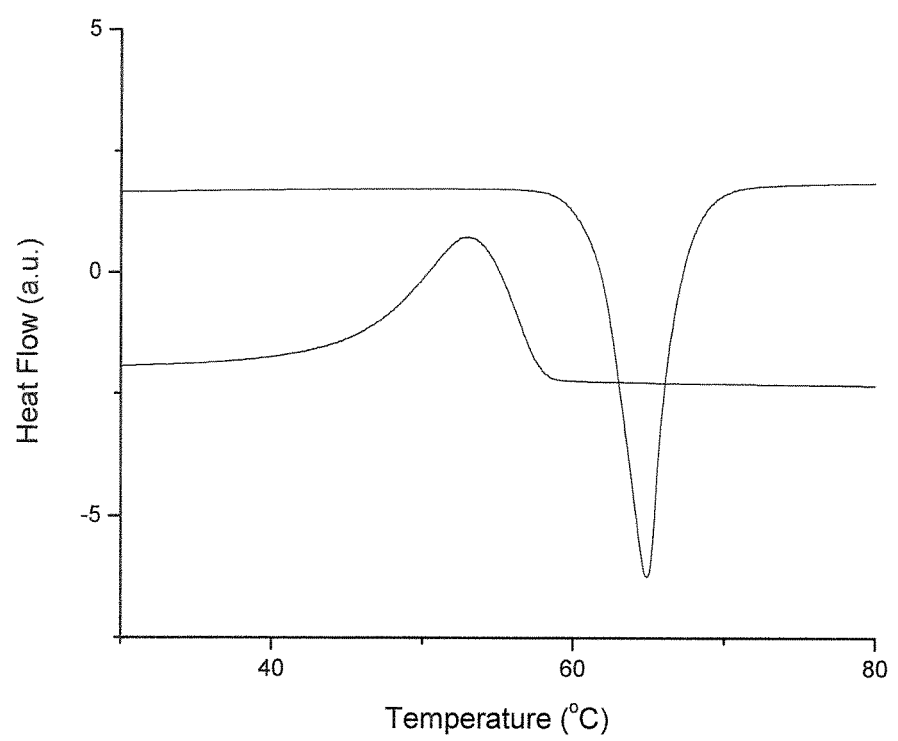
FIG. 7 provides the DSC plot of F-doped $VO_2$ nanowires (anion exchange).

Doping (Anion Exchange) of $VO_2$ Nanowires. Nanowires were synthesized as per the above procedure. The fluorine dopant was incorporated via a post treatment procedure wherein the as prepared nanowires were heated at 210° C. in a sealed container with $XeF_2$. The amount of $XeF_2$ used can range from a molar ratio of nanowires to $XeF_2$ of 1:0.1 to 1:20. The nanowires and fluorinating reagent were placed in a sealed Teflon vessel with 1-10 mL of acetonitrile and heated at 75 to 250° C. for 24 hours to 2 weeks. As shown in FIG. 6, the F-doped wires retained the M1 phase of $VO_2$ In FIG. 7, the DSC trace demonstrates a depression in the phase transition. The transition has decreased from 67.5° C. to 64.1° C. for the heating transition, and form 61.3° C. to 52.5° C. for the cooling transition.

A novel stepwise hydrothermal methodology was developed for preparing phase-pure $VO_2$ nanowires based on the initial oxalic acid reduction of $V_2O_5$ powders to $V_3O_7 \cdot H_2O$ nanowires that are subsequently reduced to a mixture of $VO_2(A)$ and $VO_2(B)$ nanowires with the help of 2-propanol. The latter metastable phases are converted to the rutile phase of $VO_2$ upon annealing, allowing for recovery of monoclinic M1 $VO_2$ nanowires with controlled-stoichiometry upon cooling. The nanowires exhibit abruptly discontinuous phase transitions exceeding three (and approaching four) orders of magnitude in electrical transport measurements, as well as sharp ensemble DSC profiles and dramatic changes of Raman spectra at the transition temperature, suggesting that this solution-phase methodology yields $VO_2$ nanowires of comparable quality and carefully controlled stoichiometry as derived from physical vapor transport methods. The electrical bandgap for the synthesized nanowires is 600 meV consistent with the optical bandgap of $VO_2$, verifying the close control of stoichiometry. The process devised here is scalable and yields free-standing nanowires that can be dispersed on arbitrary substrates or incorporated within composite materials. We have also demonstrated doping (anion exchange) of the $VO_2$ by substituting F for O.

Example 2

The following is an example of the preparation and characterization of a $VO_2$ material of the present disclosure.

Cation Doping of $VO_2$ and Tungsten Doping of $VO_2$. Experimental Methods: Analytical grade $V_2O_5$ and $H_2WO_4$ were purchased from Sigma Aldrich. 300 mg of $V_2O_5$ and an appropriate amount of tungstic acid were dispersed in a mixture of 10 mL of deionized water ($\rho$=18.2 MΩ/cm) and 6 mL of acetone in a 23 mL polytetrafluorethylene cup. The polytetrafluorethylene cup was sealed in a low-pressure Parr acid digestion bomb. The reaction was then heated at 210° C. for 3 days at an autogeneous pressure of ca. 1800-1900 psi. The reaction vessel was then allowed to cool to room temperature. The precipitate was collected by vacuum filtration and washed with copious amounts of water and acetone and then dried at ambient temperature. The precipitate was annealed at 550° C. for 3 hours under an argon ambient within a tube furnace.

Figure 8:
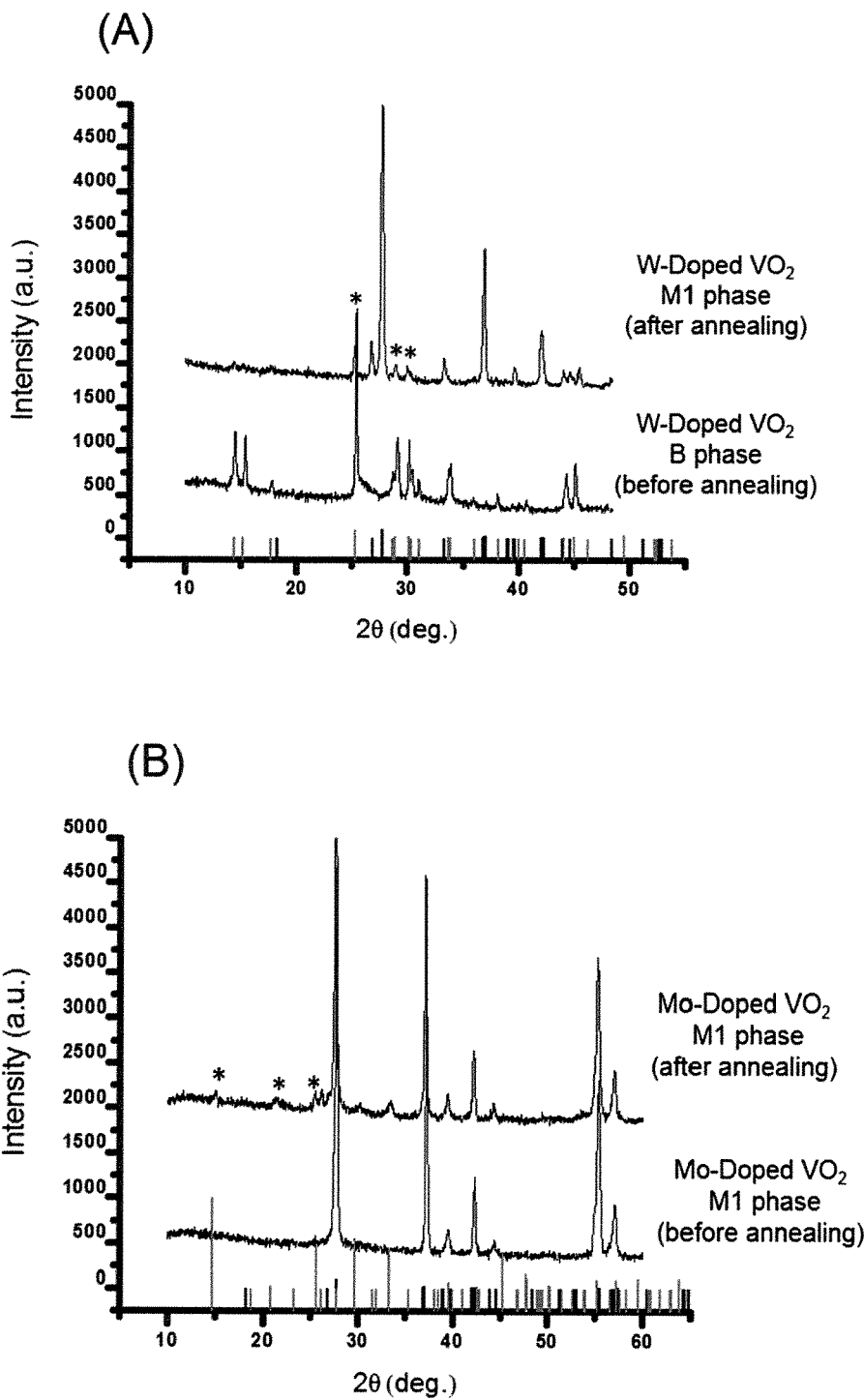
FIG. 8. (A): Powder X-ray diffraction patterns of tungsten-incorporated $VO_2$ nanostructures before and after annealing. Phase-pure W-doped $VO_2$ crystallized in the technologically relevant M1 phase is obtained upon annealing. (B) Powder X-ray diffraction patterns of Mo-doped $VO_2$ nanostructures before (black) and after (green) annealing. Phase-pure Mo-doped $VO_2$ crystallized in the technologically relevant M1 phase is obtained upon annealing. The bars indicated below correspond to the diffraction peaks expected for the M1 and B phases of $VO_2$.

Characterization: Powder X-ray diffraction (XRD) showed the powder to be $VO_2$ (B) phase before annealing and $VO_2$ (M1) phase after annealing (FIG. 8A). Inductively coupled plasma-mass spectrometry (ICP-MS) showed samples to have chemical compositions of $W_{0.0039}V_{0.961}O_2$, $W_{0.0067}V_{0.9933}O_2$, and $W_{0.0076}V_{0.9924}O_2$. The synthetic method can be elaborated to achieve W dopant concentrations in the range from 0.0001 to 15 atom %. The differential scanning calorimetry trace plotted in FIG. 7 indicates depression of the insulator→metal and metal→insulator transition temperatures upon doping of 0.39 atom % W in $VO_2$.

Molybdenum Doping of $VO_2$. Experimental Methods: Analytical grade $V_2O_5$ and $H_2MoO_4$ were purchased from Sigma Aldrich. 300 mg of $V_2O_5$ and an appropriate amount of molybdic acid were dispersed in a mixture of 10 mL of deionized water ($\rho$=18.2 MΩ/cm) and 6 mL of acetone in a 23 mL polytetrafluorethylene cup. The polytetrafluorethylene cup was sealed in a low-pressure Parr acid digestion bomb. The reaction was then heated at 210° C. for 3 days under autogeneous pressure expected to be in the range between 1800-1900 psi. The reaction vessel was then allowed to cool to room temperature. The precipitate was collected by vacuum filtration and washed with copious amounts of water and acetone and then dried at ambient temperature. The precipitate was annealed at 550° C. for 3 hours under a flowing argon ambient within a tube furnace.

Figure 9:
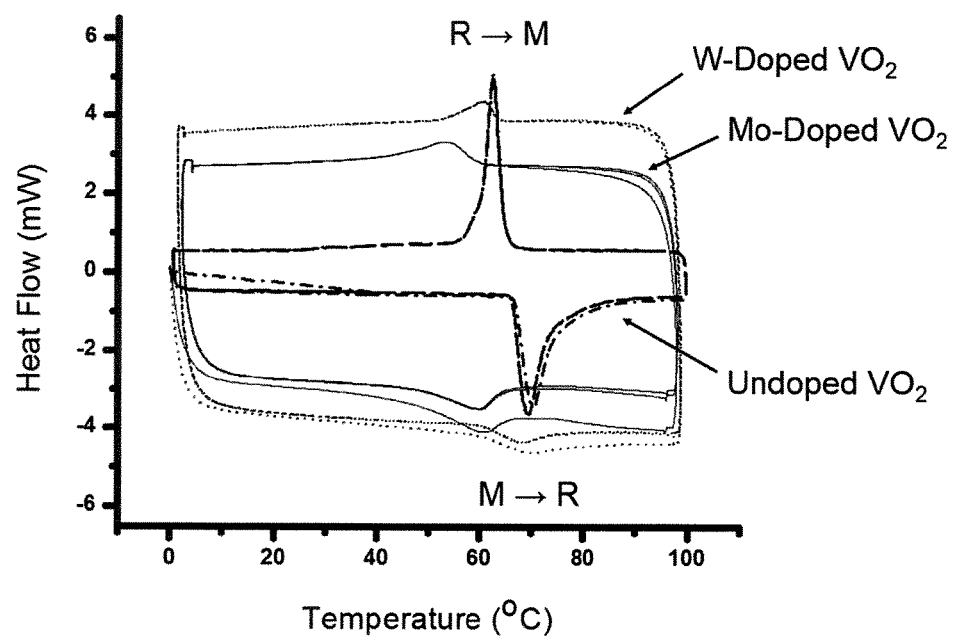
FIG. 9. Differential scanning calorimetry curves indicating that both the monoclinic→rutile and rutile→monoclinic phase transitions are depressed to lower temperatures upon incorporation of W and Mo.

Characterization: Powder X-ray diffraction (XRD) showed the powder to be $VO_2$ (M1) phase before and after annealing (FIG. 8B). Inductively Coupled Plasma-Mass Spectrometry (ICP-MS) showed the sample to have chemical composition of $Mo_{0.123}V_{0.877}O_2$. The Mo dopant concentration can be adjusted in the range between 0.0001 and 15% by choice of the dopant concentration. FIG. 9 shows the decrease of the phase transitions temperatures upon Mo doping of $VO_2$.

Anion Doping of $VO_2$. Experimental Methods: Sulfur- or fluorine-doped $VO_2$ nanowires were synthesized by the hydrothermal reduction by of $V_2O_5$ or $V_3O_2.H_2O$ in the presence of an appropriate sulfur or fluorine containing compound (e.g., thiourea or thioacetamide for S doping; ammonium fluoride or xenon fluoride for fluorine doping). The reducing agent used is 1-70 vol. % small aliphatic molecules (acetone, methanol, isopropanol) in water.

In a representative procedure, micron-sized $V_2O_5$ (Sigma-Aldrich, 98%) powders or pre-prepared $V_3O_7.H_2O$ nanowires are placed in a 23 or 125 mL polytetrafluoroethylene-lined autoclave, and heated at 210° C. for 16 to 120 hours. The reaction vessels are then cooled, and the as synthesized $VO_2$ (B) nanowires are filtered and rinsed with copious amounts of acetone, isopropanol, and water.

Figure 10:
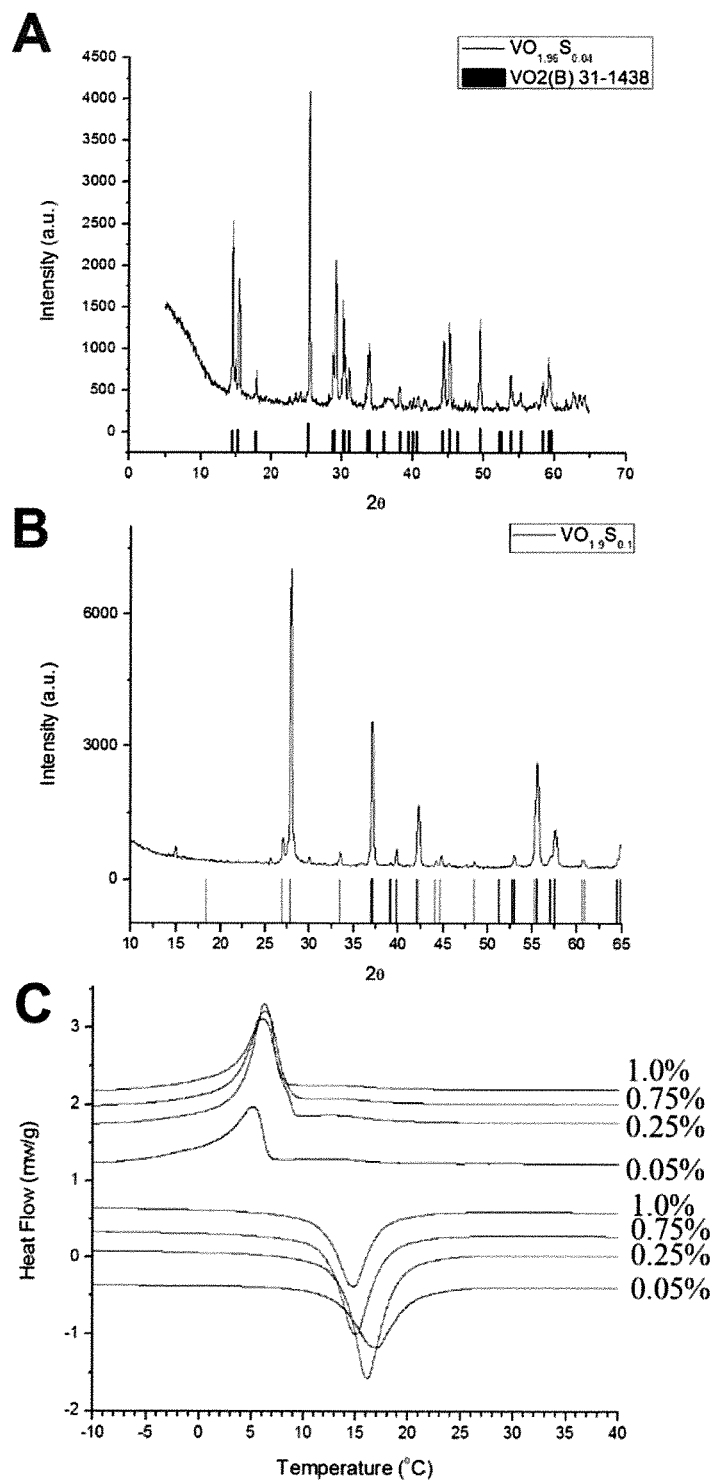
FIG. 10. (A) X-ray diffraction pattern of as-synthesized $VO_2$(B) nanowires. (B) X-ray diffraction pattern of annealed $VO_2$(M) nanowires incorporating sulfur. (c) Differential scanning calorimetry curves of S-doped $VO_2$ nanowires with intended concentrations of S dopants ranging from 0.05-1.0 atom %.

Characterization: Powder X-ray diffraction patterns of the as-synthesized $VO_2$ nanowires can be indexed to the $VO_2$ (B) phase (FIG. 10A). The dried $VO_2$ (B) powders are then annealed at 450-600° C. for 15 min to 12 hours under a flowing argon atmosphere within a tube furnace to yield $VO_2$ nanowires in the rutile (R) or monoclinic (M1) phase when cooled depending upon the specific amount of incorporated dopant. Characterization of the annealed $VO_2$ nanowires by powder diffraction, exemplified in FIG. 10B, indicates stabilization of the M1 phase of $VO_2$. Differential scanning calorimetry traces illustrated in FIG. 10C show that the monoclinic→rutile (insulating→metallic) transition occurs at 14 to 20° C., whereas the reverse rutile→monoclinic (metallic→insulating) transition occurs at 5 to 10° C. depending upon the sulfur content.

Scale-Up of $VO_2$ Synthesis. The following process describes an optimized synthetic method for the hydrothermal preparation of $VO_2$ nanowires using a 1.2 L reactor, which yields a greater than 10× increase in the amount of obtained product. In a typical synthesis, analytical grade $V_2O_5$ was purchased from Sigma Aldrich. 14.43 g of $V_2O_5$ is dispersed in a mixture of 470 mL of deionized water and 120 mL of isopropanol in a 1.2 L stainless steel cylinder. The cylinder was sealed in a PARR 4540 Pressure Reactor, which can reach pressures of 5000 psi and temperatures of 350° C. The reaction was then heated at 300° C., which corresponds to a pressure of 1300 psi, for 3 days. The reaction vessel was subsequently allowed to cool to room temperature. The precipitate was collected via vacuum filtration and washed with copious amounts of water and acetone and then dried at ambient temperature. The precipitate was annealed at 550° C. for 3 hours in an argon ambient to obtain the monoclinic phase of $VO_2$.

While the disclosure has been particularly shown and described with reference to specific embodiments (some of which are preferred embodiments), it should be understood by those having skill in the art that various changes in form and detail may be made therein without departing from the spirit and scope of the present disclosure as disclosed herein.

What is claimed is:

1. A method for making $VO_2$ nano-material or micro-material having an M1 phase structure and oxygen stoichiometry that deviates 2% or less from theoretical stoichiometry, wherein the $VO_2$ nano-material or micro-material exhibits a metal-insulator transition and 80% or more of the total change in resistivity resulting from the metal-insulator transition occurs over a range of 5° C. or less, comprising:

a) providing a solid $V_3O_7.H_2O$ nano-material or micro-material and hydrothermally reducing the solid $V_3O_7.H_2O$ nano-material or micro-material with water and, optionally, one or more agents selected from the group consisting of:

i) a $C_1$-$C_8$ linear or branched, substituted or unsubstituted, mono- or di-alcohol;

ii) a $C_1$-$C_8$ linear or branched, substituted or unsubstituted mono- or di-carboxylic acid; and iii) a $C_1$-$C_4$ linear or branched, substituted or unsubstituted dialkyl-CO to produce a mixture of $VO_2$ (A) and $VO_2$ (B) nano- or micro-material;

b) filtering and washing the product from a) to isolate the mixture of $VO_2$ (A) and $VO_2$ (B) nano-material or micro-material;

c) annealing the isolated mixture of $VO_2$ (A) and $VO_2$ (B) nano-material or micro-material under an inert atmosphere at a temperature of at least 450° C.; and d) cooling the product of c) to produce $VO_2$ nano-material or micro-material in the M1 phase.

2. The method for making $VO_2$ nano-material or micro-material of claim 1, wherein the ratio (v/v) of agent to water in a) is 1:20 to 1:1.

3. The method for making $VO_2$ nano-material or micro-material of claim 1, wherein the cooling in d) occurs by the cessation of heating.

4. The method for making $VO_2$ nano-material or micro-material of claim 1, wherein a cation dopant source is present in a) and the cation dopant source comprises a metal and the cation dopant source is a nitrate salt of the metal, acetate salt of the metal, oxalate salt of the metal, oxide of the metal, or a combination thereof.

5. The method for making $VO_2$ nano-material or micro-material of claim 4, wherein the cation dopant source is tungstic acid, chromic acid, molybdic acid, lead acetate, tungsten oxide, molybdenum oxide, niobium oxide, chromium oxide, aluminum oxide, iron oxide, titanium oxide, zirconium oxide, tantalum oxide, scandium oxide, or gallium oxide.

6. The method for making $VO_2$ nano-material or micro-material of claim 1, wherein an anion dopant source is present in a).

7. The method for making $VO_2$ nano-material or micro-material of claim 6, wherein the anion dopant source comprises a semi-metal or main group element.

8. The method for making $VO_2$ nano-material or micro-material of claim 1, further comprising obtaining $V_3O_7.H_2O$ nano-material or micro-material by:

e) hydrothermally exfoliating and reducing bulk vanadium pentoxide ($V_2O_5$) with water and a reducing agent; and f) isolating the $V_3O_7.H_2O$ nano-material or micro-material from the product from e).

9. The method for making $VO_2$ nano-material or micro-material of claim 8, wherein the isolating the $V_3O_7.H_2O$ nano-material or micro-material is carried out by filtering and washing the product from e).

* * * * *